United States Patent
Sandberg et al.

(10) Patent No.: US 7,318,723 B2
(45) Date of Patent: Jan. 15, 2008

(54) FRAME FOR A PATTY-FORMING APPARATUS

(75) Inventors: Glenn Sandberg, New Lenox, IL (US); Salvatore Lamartino, Orland Park, IL (US); Scott A. Lindee, Mokena, IL (US); David Hansen, Orland Park, IL (US)

(73) Assignee: Formax, Inc., Mokena, IL (US)

( * ) Notice: Subject to any disclaimer, the term of this patent is extended or adjusted under 35 U.S.C. 154(b) by 342 days.

(21) Appl. No.: 10/942,726

(22) Filed: Sep. 16, 2004

(65) Prior Publication Data

US 2005/0072313 A1     Apr. 7, 2005

Related U.S. Application Data

(60) Provisional application No. 60/503,354, filed on Sep. 16, 2003, provisional application No. 60/515,585, filed on Oct. 29, 2003.

(51) Int. Cl.
*A22C 7/00* (2006.01)

(52) U.S. Cl. .................. 425/574; 425/556; 426/512; 426/513

(58) Field of Classification Search ............... 426/512, 426/513; 425/574, 556; *A22C 7/00*
See application file for complete search history.

(56) References Cited

U.S. PATENT DOCUMENTS

| | | | |
|---|---|---|---|
| 3,952,478 A | 4/1976 | Richards et al. | |
| 4,054,967 A | 10/1977 | Sandberg et al. | |
| RE30,096 E | 9/1979 | Richards | |
| 4,182,003 A | 1/1980 | Lamartino et al. | |
| 4,356,595 A | 11/1982 | Sandberg et al. | |
| 4,372,008 A | 2/1983 | Sandberg | |
| 4,780,931 A * | 11/1988 | Powers et al. | 425/556 |
| 4,821,376 A | 4/1989 | Sandberg | |
| 4,996,743 A | 3/1991 | Janssen | |
| 5,655,436 A | 8/1997 | Soper | |

(Continued)

OTHER PUBLICATIONS

Introducing the Formax F-400, 2 pages, Formax, Inc., Admitted Prior Art.
Formax 6, 6 pages, Formax, Inc., Admitted Prior Art.

(Continued)

*Primary Examiner*—Yogendra N. Gupta
*Assistant Examiner*—Maria Veronica Ewald
(74) *Attorney, Agent, or Firm*—The Law Office of Randall T. Erickson, P.C.

(57) ABSTRACT

A frame structure is provided for a reciprocating mold plate type food product forming apparatus. The frame structure includes an angular strut configuration for resisting horizontal reciprocating forces caused by the reciprocating mold plate and associated drive, and a tie rod arrangement for resisting separation-reaction forces caused by food product compression by a plunger in a pump cylinder of a food product pump. A base plate supports the frame structure. A first angular strut extends from a rear location forwardly and upwardly to an elevated central location and is fixed to the frame portion. A second angular strut extends from a forward location rearward and upwardly to the elevated central location and is fixed to said frame portion. The first and second struts transfer the horizontal component of the reciprocating forces into the base plate. A plurality of tie rods span between a backing plate that mounts a hydraulic cylinder that drives the plunger, and the pump cylinder. A one piece pump housing and valve manifold is incorporated into the apparatus.

21 Claims, 20 Drawing Sheets

U.S. PATENT DOCUMENTS 5,730,650 A    3/1998  Soper
6,428,303 B2 *  8/2002  Lindee et al. ............... 425/215

OTHER PUBLICATIONS

Pump Box Assembly, F-26C Manual, Dec. 7, 1999, 1 page, Formax, Inc.

Illustration 1, F-26C Manual, 1997, 1 page, Formax, Inc.

Illustration 9, F-26C Manual, 1997, 1 page, Formax, Inc.

Illustration 13, F-26C Manual, 1997, 1 page, Formax, Inc.

Plunger Cylinders Testing, Rebuilding & Replacement, F-26C Manual, 1997, 5 pages, Formax, Inc.

* cited by examiner

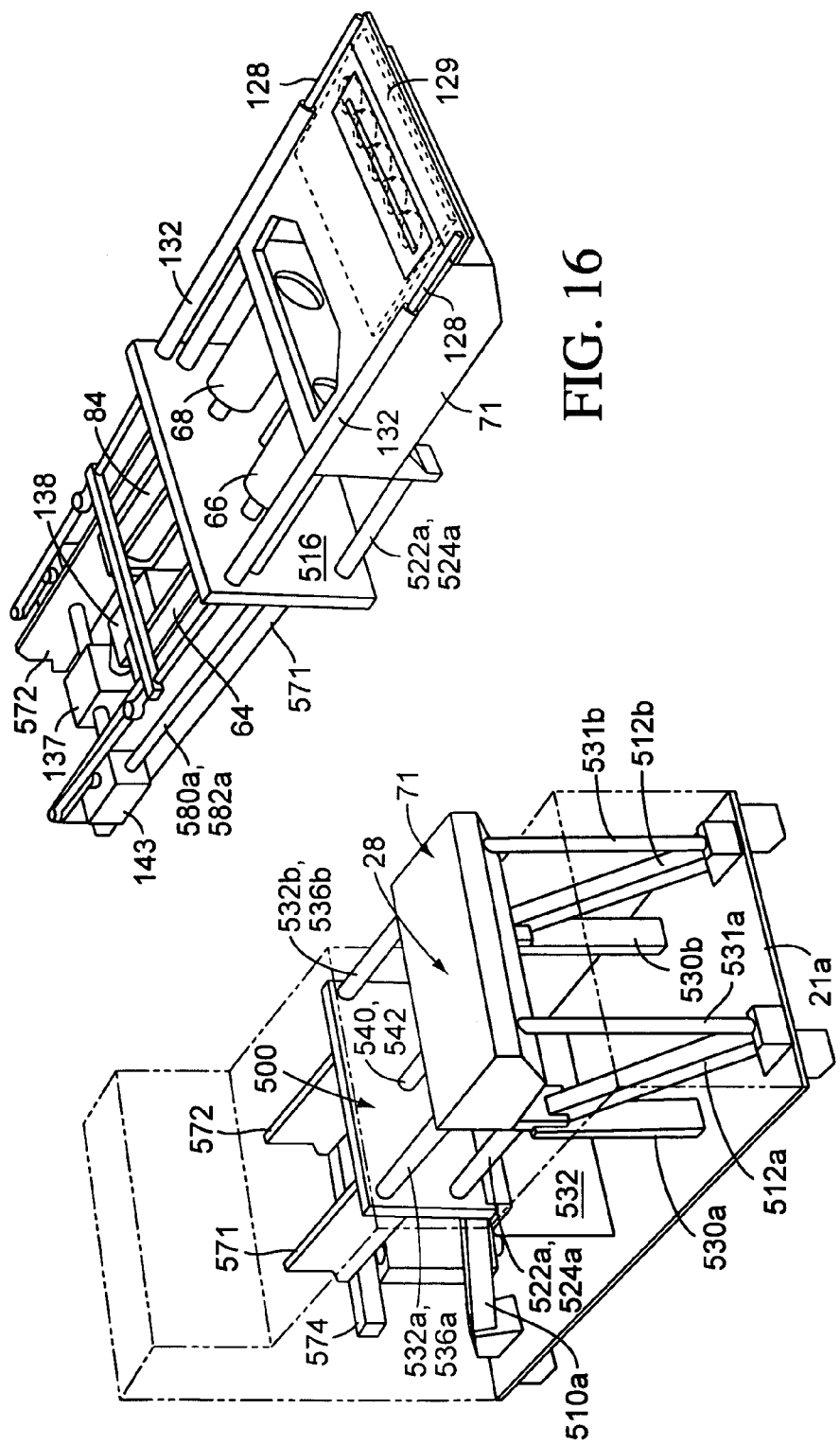

FRAME FOR A PATTY-FORMING APPARATUS

This application claims the benefit of U.S. provisional application Ser. No. 60/503,354, filed Sep. 16, 2003, and U.S. provisional application Ser. No. 60/515,585, filed Oct. 29, 2003.

BACKGROUND OF THE INVENTION

Use of pre-processed foods, both in homes and in restaurants, has created a demand for high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F400 reciprocating mold plate forming machines, available from Formax, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743 herein incorporated by reference.

Although heretofore known FORMAX patty-molding machines have achieved commercial success and wide industry acceptance, the present inventors have recognized that needs exist for a forming machine having an even greater durability and an even greater duration of maintenance free operation. The present inventors have recognized that needs exist for an enhanced effectiveness of a patty-forming machine in producing uniform patties, for an even greater output rate of patties from a patty-forming machine, and for an enhanced convenience for cleaning and maintenance of a patty-forming machine.

SUMMARY OF THE INVENTION

A frame structure for a reciprocating mold plate type food product forming apparatus includes an angular strut configuration for resisting horizontal reciprocating forces caused by the reciprocating mold plate and associated drive, and a tie rod arrangement for resisting reaction forces caused by food product compression in a food product plunger pump. A typical forming apparatus comprises at least one hydraulically driven pump that includes a pump piston or plunger driven into a pump cylinder by a hydraulic cylinder to pressurize food product. The tie rod arrangement resists the reaction force from this pressurizing.

According to one aspect of an exemplary embodiment, a frame portion supports a reciprocating mold plate. A base plate supports the frame portion. A first angular strut extends from a rear location forward and upwardly to an elevated central location and is fixed to the frame portion. A second angular strut extends from a forward location rearward and upwardly to the elevated central location and is fixed to the frame portion. The first and second struts transfer the horizontal component of the reciprocating forces into the base plate.

According to another aspect of the exemplary embodiment, at least one of the angular struts is fastened to the central location and to the base plate to be removable.

According to another aspect of the exemplary embodiment, the struts are designed to be adjustable in position during installation and easily installed and reinstalled as necessary. The replaceable struts allow for a more efficient assembly of the apparatus, particularly for the installation or removal of mechanical equipment within the machine base. If for any reason a strut is damaged, a replacement can be installed without undue difficulty.

According to another aspect of the exemplary embodiment, the base plate comprises a steel plate substantially coextensive in plan with the frame structure.

According to another aspect of an exemplary embodiment, the frame portion supports a hydraulic cylinder and a pump cylinder, and comprises rods operatively connected between the hydraulic cylinder and the pump cylinder, the rods having a thickness to resist a reaction force caused by the pump piston pressurizing food product within the pump cylinder.

According to another aspect of the invention, the heretofore known multipart, assembled and fastened together pump housing and tube valve manifold is replaced with a one piece pump housing and tube valve manifold cast or otherwise formed as a single part. The one piece pump housing/valve manifold also functions as an integral part of the machine frame.

The frame structure of the invention isolates high loads and stresses within the machine. Pre-stressed rods contain mold plate drive forces and plunger forces. The frame structure of the invention provides an overall rigid design. Wear and tear on the frame structure and on the drive components is minimized and machine durability is increased. Maintenance on the frame structure and on the drive components is reduced.

The invention also provides an improved high-speed patty molding machine that is inherently quiet in operation.

The invention also provides an improved high-speed food patty molding machine that is simple and cost effectively manufactured and assembled, and that can be readily disassembled for cleaning of the machine.

Numerous other advantages and features of the present invention will be become readily apparent from the following detailed description of the invention and the embodiments thereof, and from the accompanying drawings.

BRIEF DESCRIPTION OF THE DRAWINGS

FIG. 15 is a diagrammatic view of the frame structure of FIG. 14;

FIG. 16 is an enlarged diagrammatic view of a portion of the frame structure of FIG. 15;

DETAILED DESCRIPTION OF THE PREFERRED EMBODIMENTS

Figure 1:
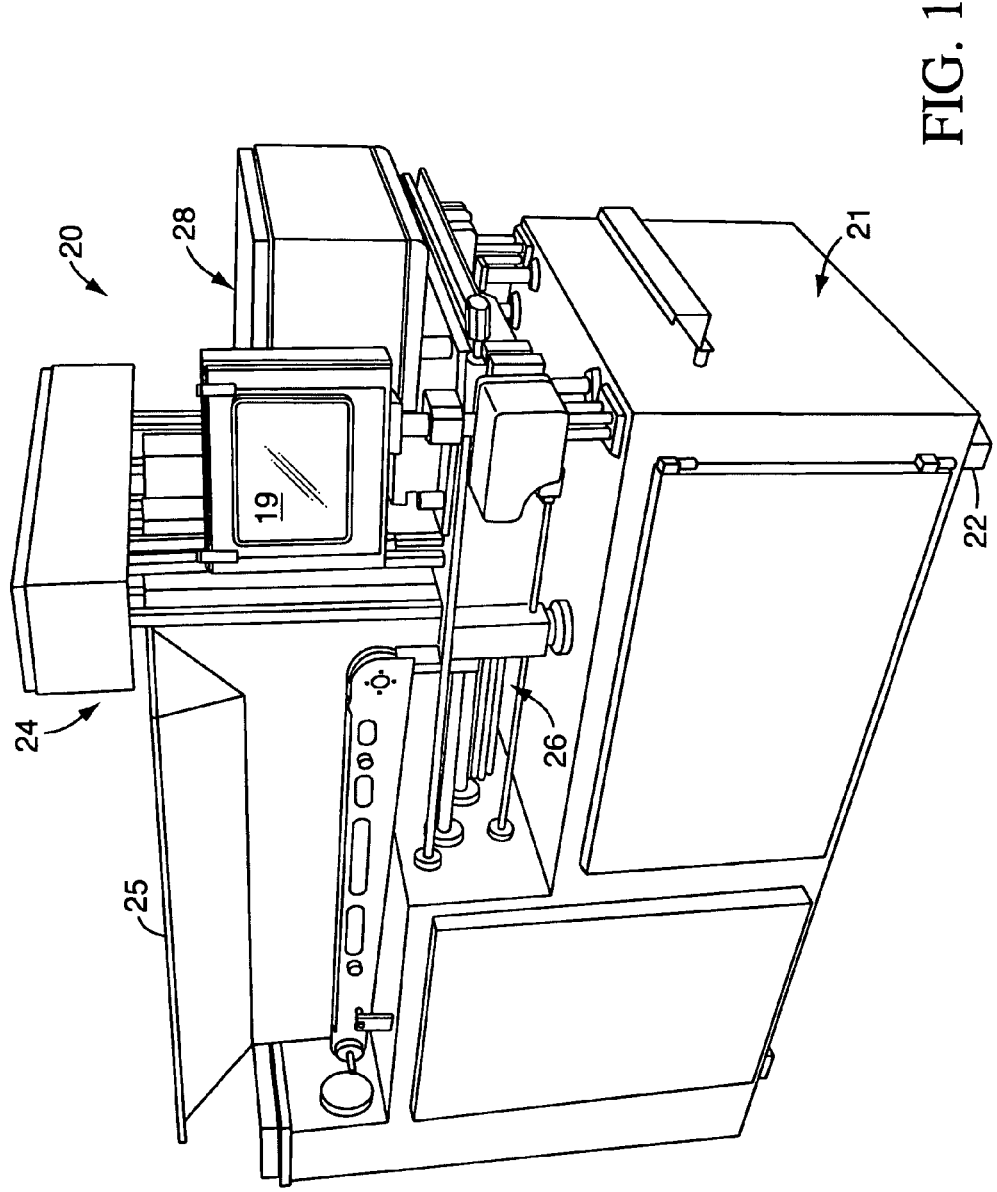
FIG. 1 is a perspective view of a patty-forming machine of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description of the Apparatus

The high-speed food patty molding machine 20 illustrated in the figures comprises a preferred embodiment of the invention. The complete machine is described in U.S. Ser. No. 10/942,627, filed on the same day as the present application, and herein incorporated by reference. This application also incorporates by reference U.S. Application Ser. No. 60/503,354, filed Sep. 16, 2003 and U.S. Provisional Application Ser. No. 60/515,585, filed Oct. 29, 2003.

The molding machine 20 includes a machine base 21, having a base plate 21a preferably mounted upon a plurality of feet 22, rollers or wheels. The base 21 has a length L (FIG. 2) of 112.5 inches and a width W (FIG. 3) of 49 inches. The machine base 21 supports the operating mechanism for machine 20 and can contains hydraulic actuating systems, electrical actuating systems, and most of the machine controls. The machine 20 includes a supply 24 for supplying moldable food material, such as ground beef, fish, or the like, to the processing mechanisms of the machine.

A control panel 19, such as a touch screen control panel, is arranged on a forward end of the apparatus 20 and communicates with a machine controller.

As generally illustrated in FIGS. 2-6, supply means 24 comprises a large food material storage hopper 25 that opens into the intake of a food pump system 26. The food pump system 26 includes at least two food pumps 61, 62, described in detail hereinafter, that continuously, or intermittently under a pre-selected control scheme, pump food material, under pressure, into a manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The hopper 25 includes a surrounding sidewall 25b that defines an open top end 25c and an open bottom face 25d. A conveyor belt 31 of a conveyor 30 defines a substantial portion of the bottom of the hopper to the forward end 25a. A top surface 31a of the conveyor belt 31 moves food material longitudinally of the hopper 25 to the forward end 25a.

The food material is moved by supply means 24 into the intake of plunger pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

Figure 1A:
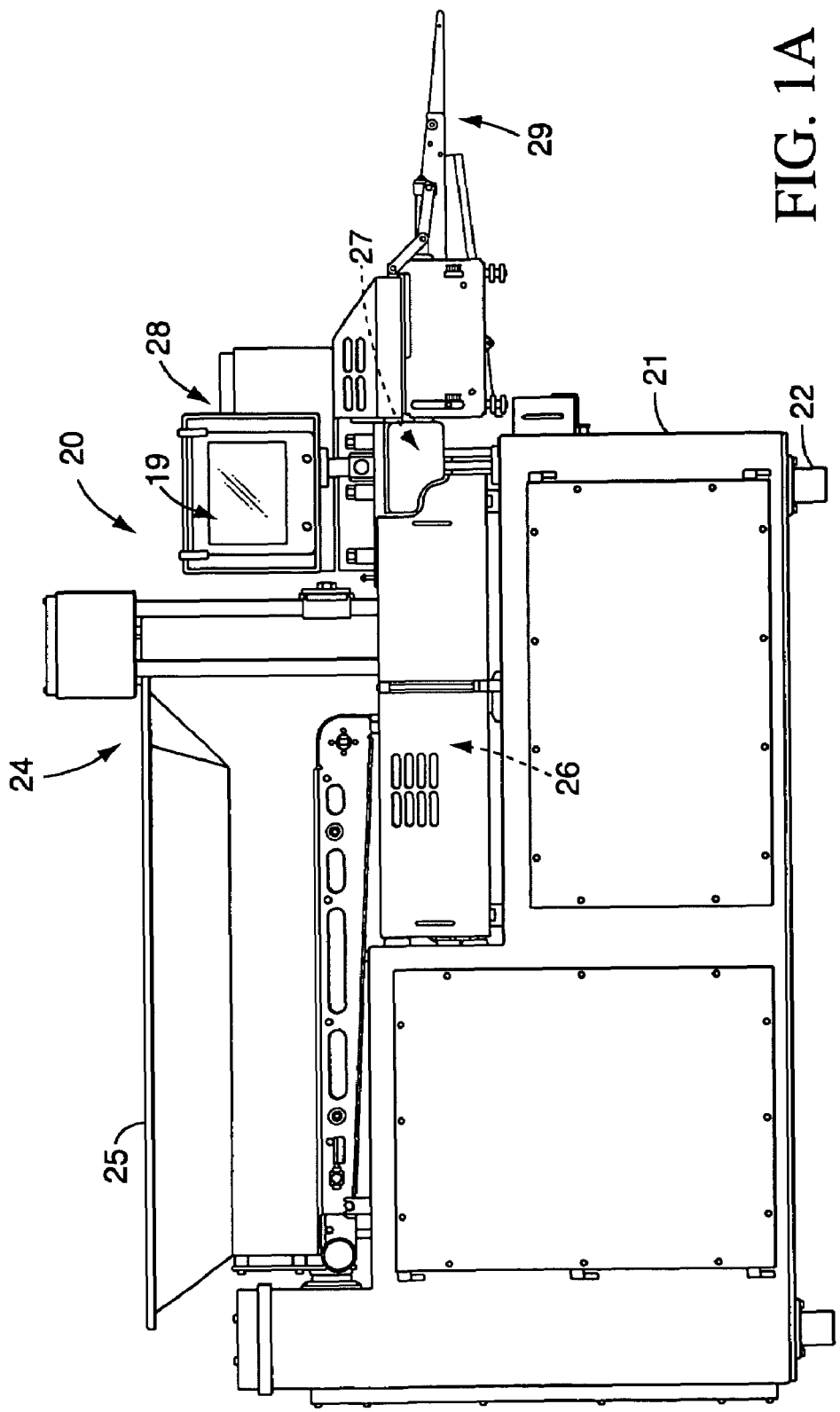
FIG. 1A is an elevational view of the patty-forming machine of FIG. 1.

The manifold 27 comprises a system for feeding the food material, still under relatively high pressure, into the molding mechanism 28. Molding mechanism 28 operates on a cyclic basis, first sliding a multi-cavity mold plate 32 into a receiving or cavity fill position over manifold 27 (FIG. 9A) and then away from the manifold to a patty discharge position (FIG. 9B) aligned with a series of knock out cups 33. When the mold plate 32 is at its discharge position, knock out cups plungers or cups 33 are driven downwardly as indicated by 33A in FIG. 2, discharging hamburgers or other molded patties from machine 20. The molded patties are deposited onto a conveyor 29 (FIG. 1A), to be transported away from the apparatus 20.

Food Supply System

The food supply means 24 and associated hopper 25 are illustrated in FIGS. 2-6. As seen, the conveyor belt 31 spans completely across the bottom of hopper 25, around an end of idler roller or pulley 35 and drive roller or pulley 36, the lower portion of the belt being engaged by a tensioning roller 37. In some cases the tensioning roller 37 may not be necessary, and can be eliminated. A drum motor (not visible) is provided within the drive roller 36 for rotating the drive roller.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the outlet 39. A motor housing 40 is mounted to a top of the frame 42. A support plate 43 is affixed to the upper portion of frame 42 extending over the outlet 39 in hopper 25. The frame comprises four vertical tie rods 44a surrounded by spacers 44b (FIG. 5).

Figure 5:
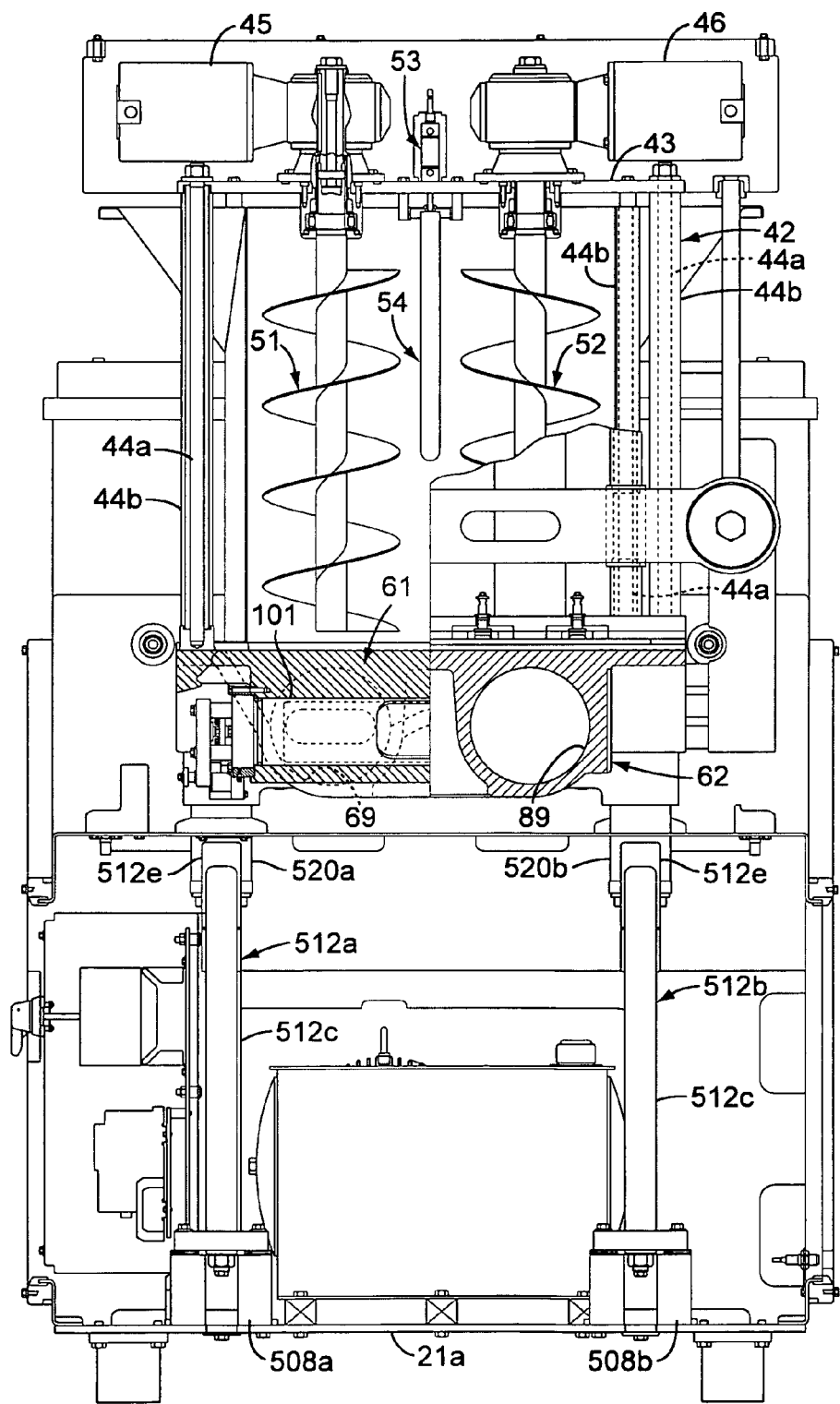
FIG. 5 is a sectional view taken generally along line 5-5 of FIG. 2, with some components and/or panels removed for clarity.

As shown in FIG. 5, the vertical pump 38 comprises two feed screw motors 45, 46 that drive feed screws 51, 52. The two electrical feed screw motors 45, 46 are mounted on support plate 43, within the housing 40. Motor 45 drives the feed screw 51 that extends partly through opening 39 in alignment with a pump plunger 66 of the pump 61. Motor 46 drives the feed screw 52 located at the opposite side of hopper 25 from feed screw 51, and aligned with another pump plunger 68 of the pump 62.

A level sensing mechanism 53 (FIGS. 2 and 5) is located at the outlet end 25a of hopper 25 comprising an elongated sensing element 54. As the moldable food material is moved forwardly in the hopper 25, it may accumulate to a level in which it engages the sensing element 54. When this occurs, a signal is generated to interrupt the drive for the roller 36 of conveyor 31. In this manner the accumulation of food material at the forward end 25a of hopper 25 is maintained at an advantageous level.

Figure 2:
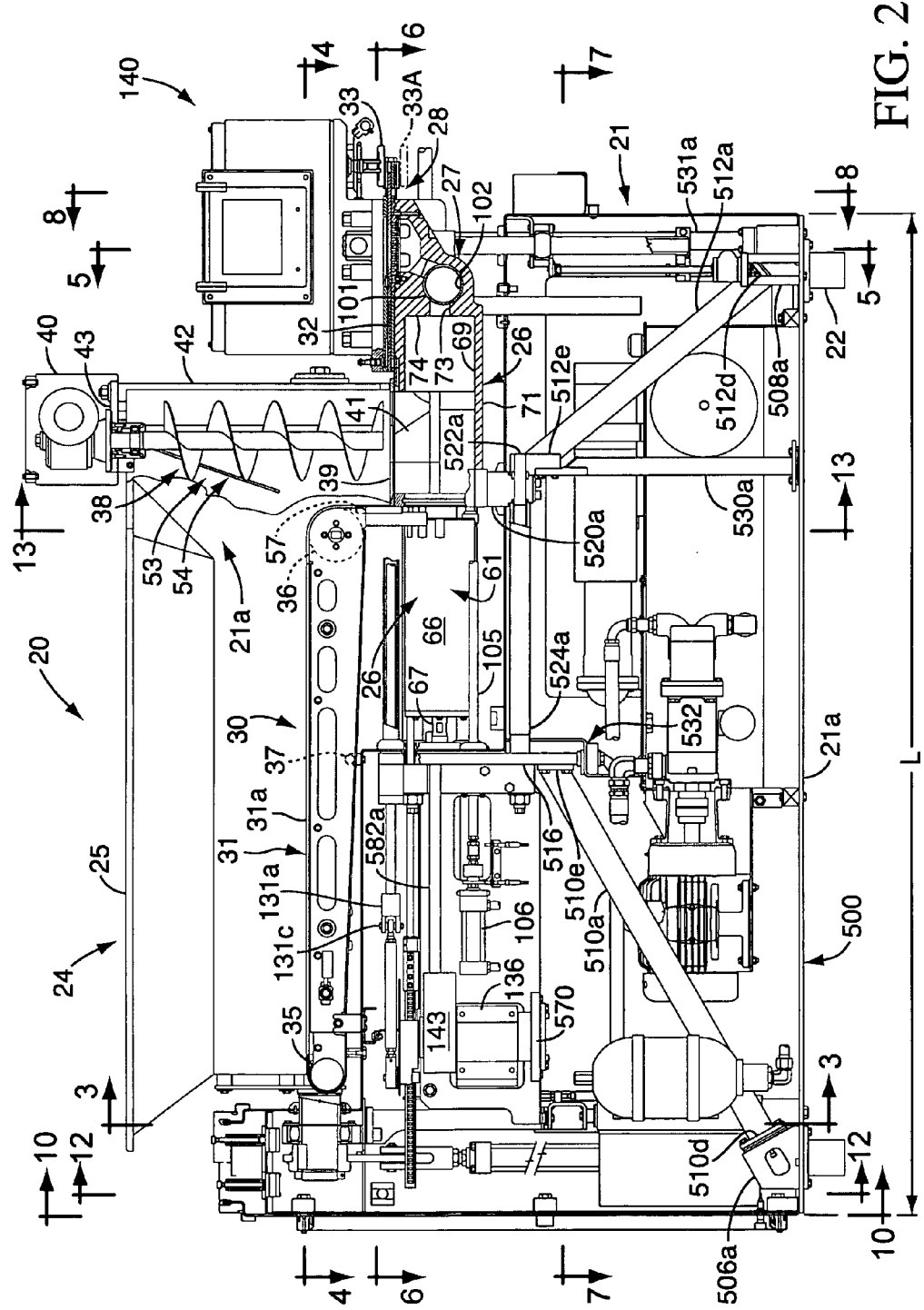
FIG. 2 is a longitudinal sectional view of the patty-forming machine of FIG. 1, with some components and/or panels removed for clarity.

When machine 20 is in operation, the feed screw motor 45 is energized whenever plunger 66 is withdrawn to the position shown in FIG. 2, so that feed screw 51 supplies meat from hopper 25 downwardly through outlet 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 is depleted, the conveyor belt 31 continuously moves food forwardly in the hopper and into position to be engaged by the feed screws 51, 52. If the level of meat at the outlet 39 becomes excessive, conveyor 31 is stopped, as described above, until the supply at the hopper outlet is again depleted.

The wall of the outlet 39 immediately below conveyor drive rollers 36 comprises a belt wiper plate 57 that continuously engages the surface of the conveyor 31 to prevent leakage of the food material 38 from the hopper at this point.

Food Pump System

Figure 6:
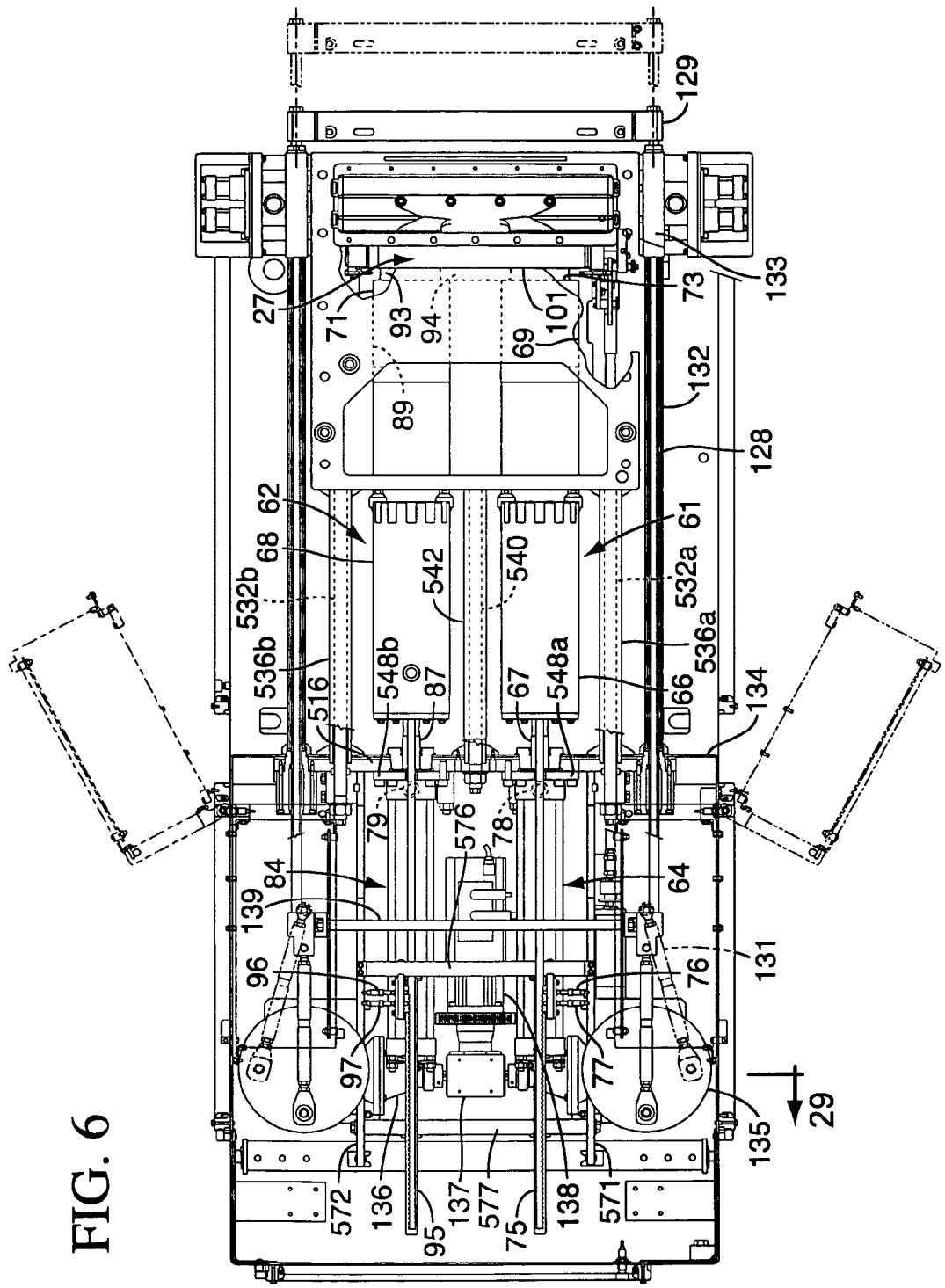
FIG. 6 is a sectional view taken generally along line 6-6 of FIG. 2, with some components and/or panels removed for clarity.
Figure 7:
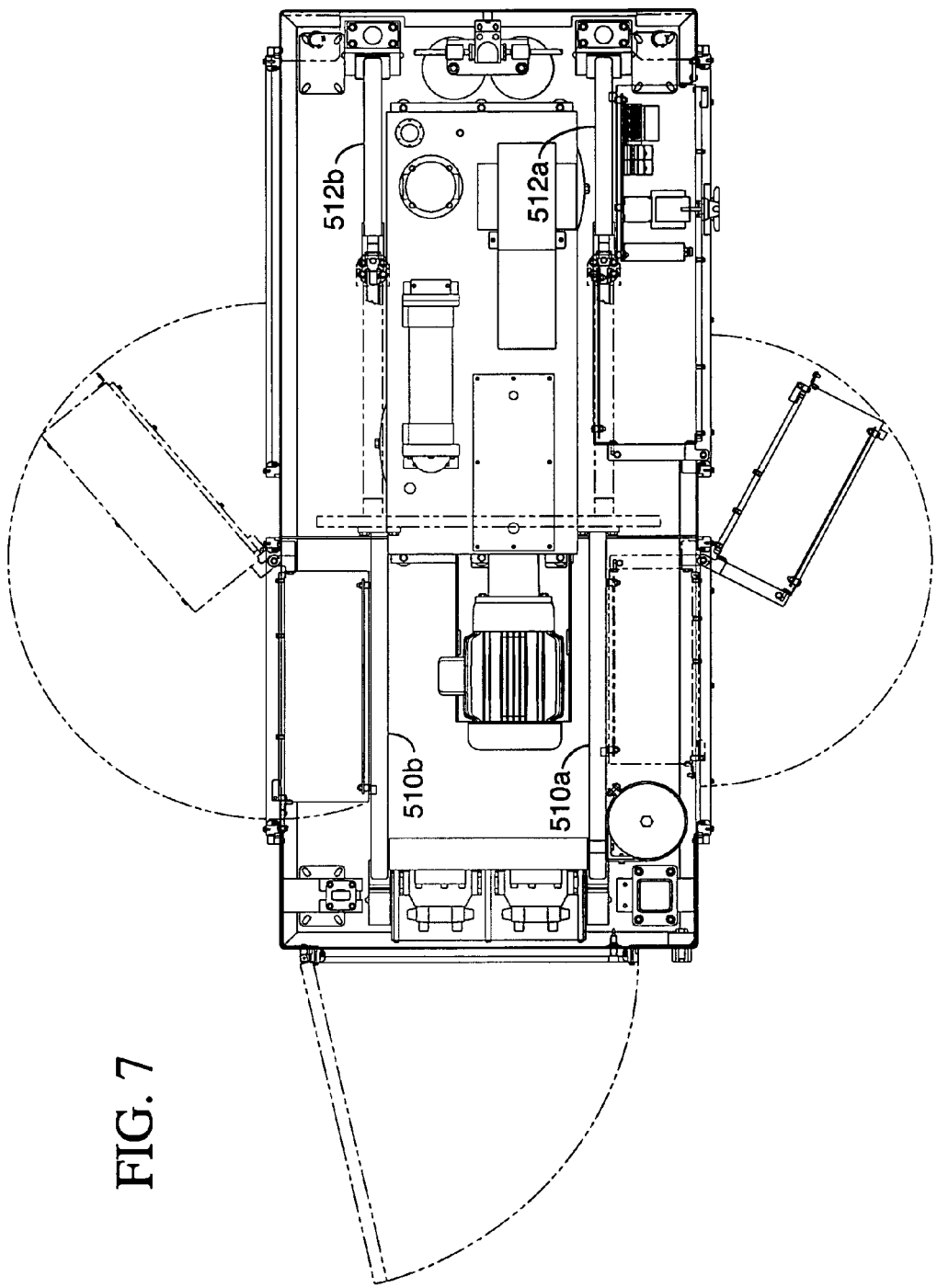
FIG. 7 is a sectional view taken generally along line 7-7 of FIG. 2, with some components and/or panels removed for clarity.
Figure 8:
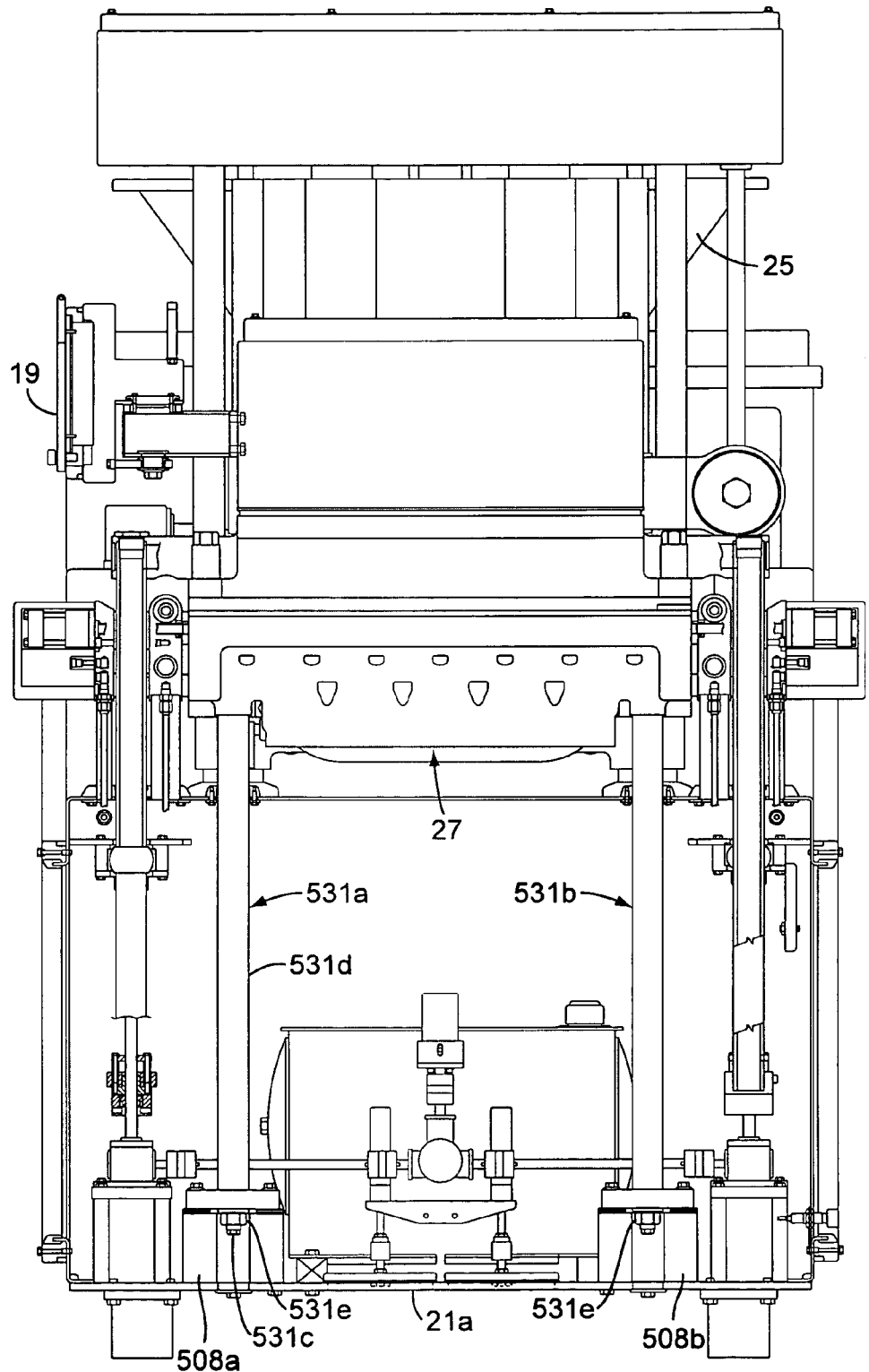
FIG. 8 is a sectional view taken generally along line 8-8 of FIG. 2, with some components and/or panels removed for clarity.

The food pump system 26 of molding machine 20 is best illustrated in FIGS. 2 and 6. Pump system 26 comprises the two reciprocating food pumps 61, 62 mounted on the machine base 21. The first food pump 61 includes a hydraulic cylinder 64. The piston in cylinder 64 (not shown) is connected to an elongated piston rod 67; the outer end of the elongated piston rod 67 is connected to the large plunger 66. The plunger 66 is aligned with a first pump cavity 69 formed by a pump cavity enclosure or housing 71 that is divided into two pump chambers. The forward wall 74 of pump cavity 69 has a relatively narrow slot 73 that communicates with the pump manifold 27 as described more fully hereinafter.

Preferably, the pump housing 71 and the valve manifold 27 are cast or otherwise formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 in housing 71. The forward wall 94 of pump cavity 89 includes a narrow elongated slot 93 communicating with manifold 27.

Advantageously, the plungers 66, 68 and cavities 69, 89 have round cross sections for ease of manufacturing and cleaning.

An elongated proximity meter 75 is affixed to the first pump plunger 66 and extends parallel to piston rod 67 into alignment with a pair of proximity sensors 76 and 77. A similar proximity meter 95 is fixed to and projects from plunger 68, parallel to piston rod 87, in alignment with a pair of proximity sensors 96, 97. Proximity sensors 76, 77 and 96, 97 comprise a part of the control of the two pumps 61, 62.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the cavity 69 during the molding cycle, or preferably can provide a pre-selected pressure profile over the molding cycle such as described in U.S. Pat. No. 4,356,595, incorporated herein by reference, or as utilized in currently available FORMAX machines. The pressure applied through pump 61 is sensed by a pressure sensing switch 78 connected to a port of the cylinder 64.

As plunger 66 advances, the corresponding movement of proximity meter 75 signals the sensor 76, indicating that plunger 66 is near the end of its permitted range of travel. When this occurs, pump 62 is actuated to advance plunger 68 through pump cavity 89, compressing the food material in the second pump cavity in preparation for feeding the food material from the cavity into manifold 27. The pressure applied through pump 62 is sensed by a pressure sensing switch 79 connected to one port of cylinder 84.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, proximity sensor 96, signals the need to transfer pumping operations to pump 61. The changeover process described immediately above is reversed; pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

The valve manifold 27, shown in FIGS. 2 and 6, holds a manifold valve cylinder or tube valve 101 fit into an opening 102 in housing 71 immediately beyond the pump cavity walls 74 and 94.

According to the illustrated embodiment, valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold and both pump cavities 69 and 89. Cylinder 101 also includes an elongated outlet slot 109. The valve cylinder outlet slot 109 is generally aligned with a slot 111 (see FIG. 9A) in housing 71 that constitutes a feed passage for molding mechanism 28.

One end wall of valve cylinder 101 includes an externally projecting base end 103 that is connected to a drive linkage 104, in turn connected to the end of the piston rod 105 of a hydraulic actuator cylinder 106 (FIG. 2).

When the pump 61 is supplying food material under pressure to molding mechanism 28, actuator cylinder 106 has retracted piston rod 105 to the inner limit of its travel, angularly orienting the manifold valve cylinder 101. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 27. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

The valve cylinder 101 and corresponding slots or openings can alternately be as described in U.S. Provisional Application 60/571,368, filed May 14, 2004, or U.S. Ser. No. 10/942,754, filed on the same day as the present invention, both herein incorporated by reference. According to these disclosures, rather than a single outlet 109, two rows of progressively sized outlets, smallest closest to the active pump, are alternately opened to plural openings that replace the single opening 111.

Molding Mechanism

Figure 9A:
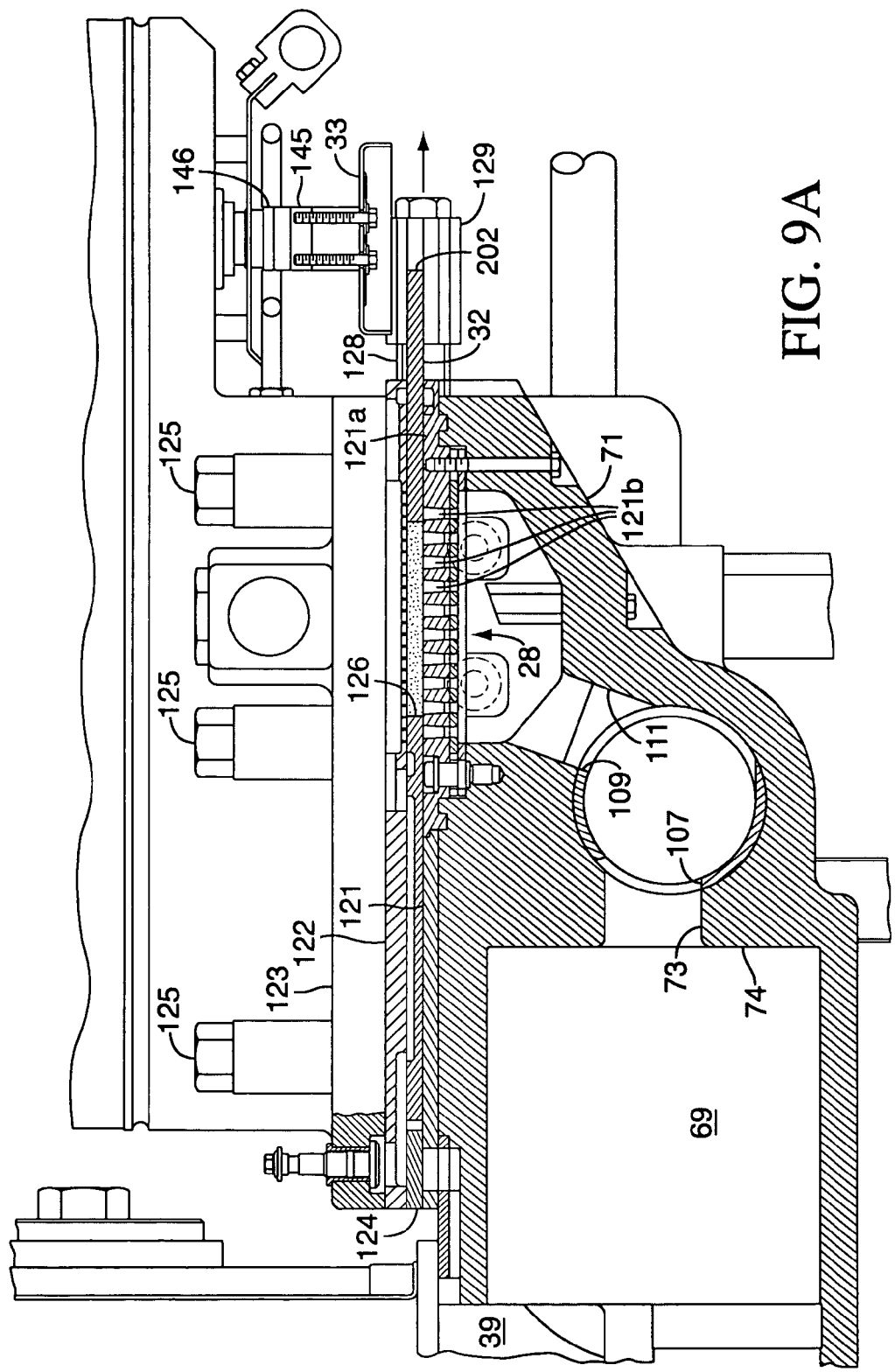
FIG. 9A is an enlarged fragmentary sectional view taken from FIG. 2, showing the machine configuration as the mold plate in a fill position.

As best illustrated in FIG. 9A, the upper surface of the housing 71 that encloses the pump cavities 69 and 89 and the manifold 27 carries a support plate or wear plate 121 and a fill plate 121*a* that forms a flat, smooth mold plate support surface. The mold support plate 121 and the fill plate 121*a* may be fabricated as two plates as shown or a single plate bolted to or otherwise fixedly mounted upon housing 71. The fill plate 121*a* includes apertures or slots 121*b* that form the upper portion of the manifold outlet passage 111. In the apparatus illustrated, a multi fill orifice type fill plate 121*a* is utilized. A simple slotted fill plate is also encompassed by the invention.

Mold plate 32 is supported upon plates 121, 121*a*. Mold plate 32 includes a plurality of individual mold cavities 126 extending across the width of the mold plate and alignable with the manifold outlet passageway 111. Although a single row of cavities is shown, it is also encompassed by the invention to provide plural rows of cavities, stacked in aligned columns or in staggered columns. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon spacers 124 when the molding mechanism is assembled for operation. Cover plate 122 and mold cover casting are held in place by six mounting bolts, or nuts tightened on studs, 125.

A mold plate drive system is described in U.S. Ser. No. 10/943,805, filed on the same day as the present application, and is herein incorporated by reference.

Figure 3:
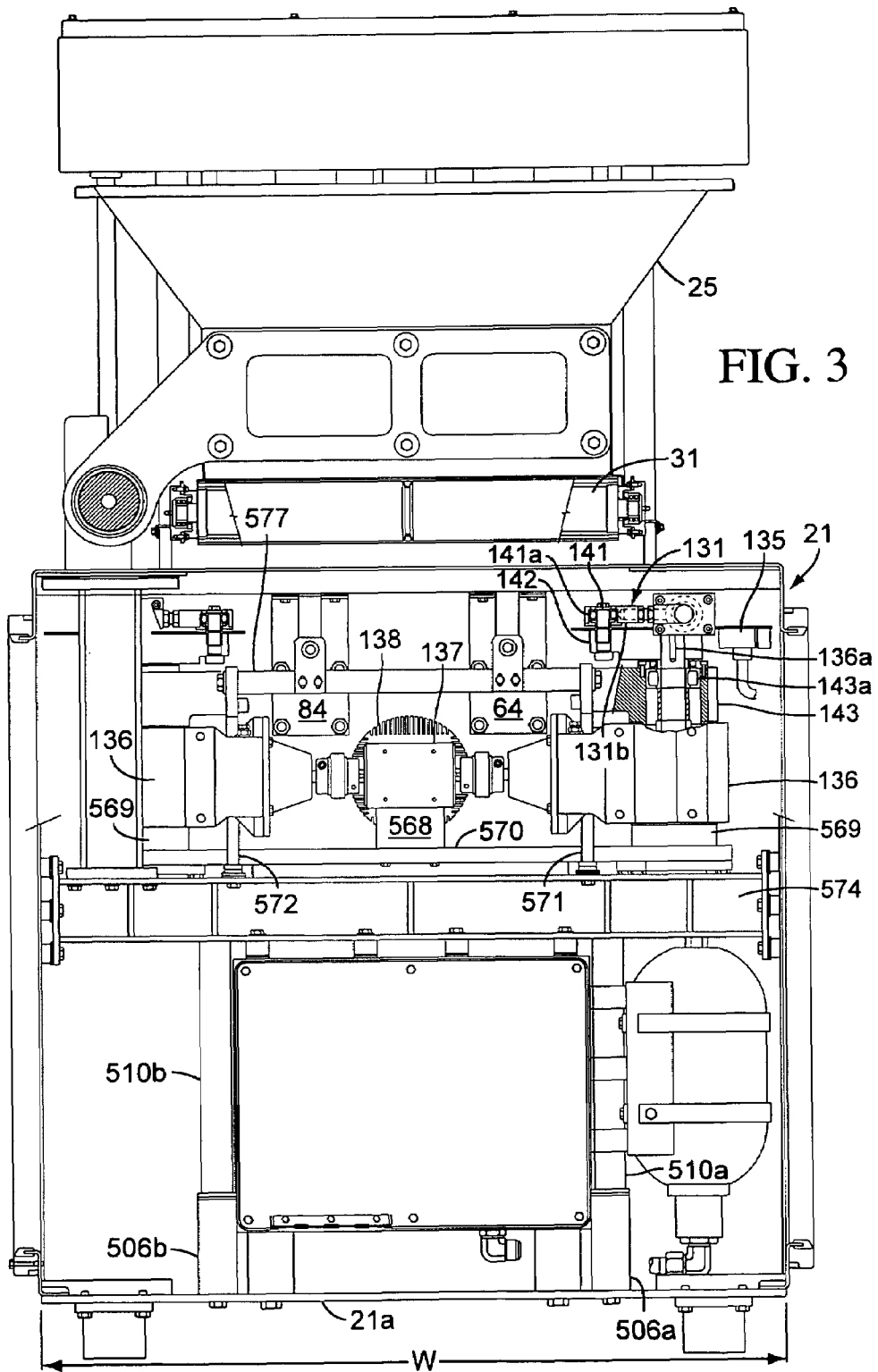
FIG. 3 is a sectional view taken generally along line 3-3 of FIG. 2, with some components and/or panels removed for clarity.
Figure 4:
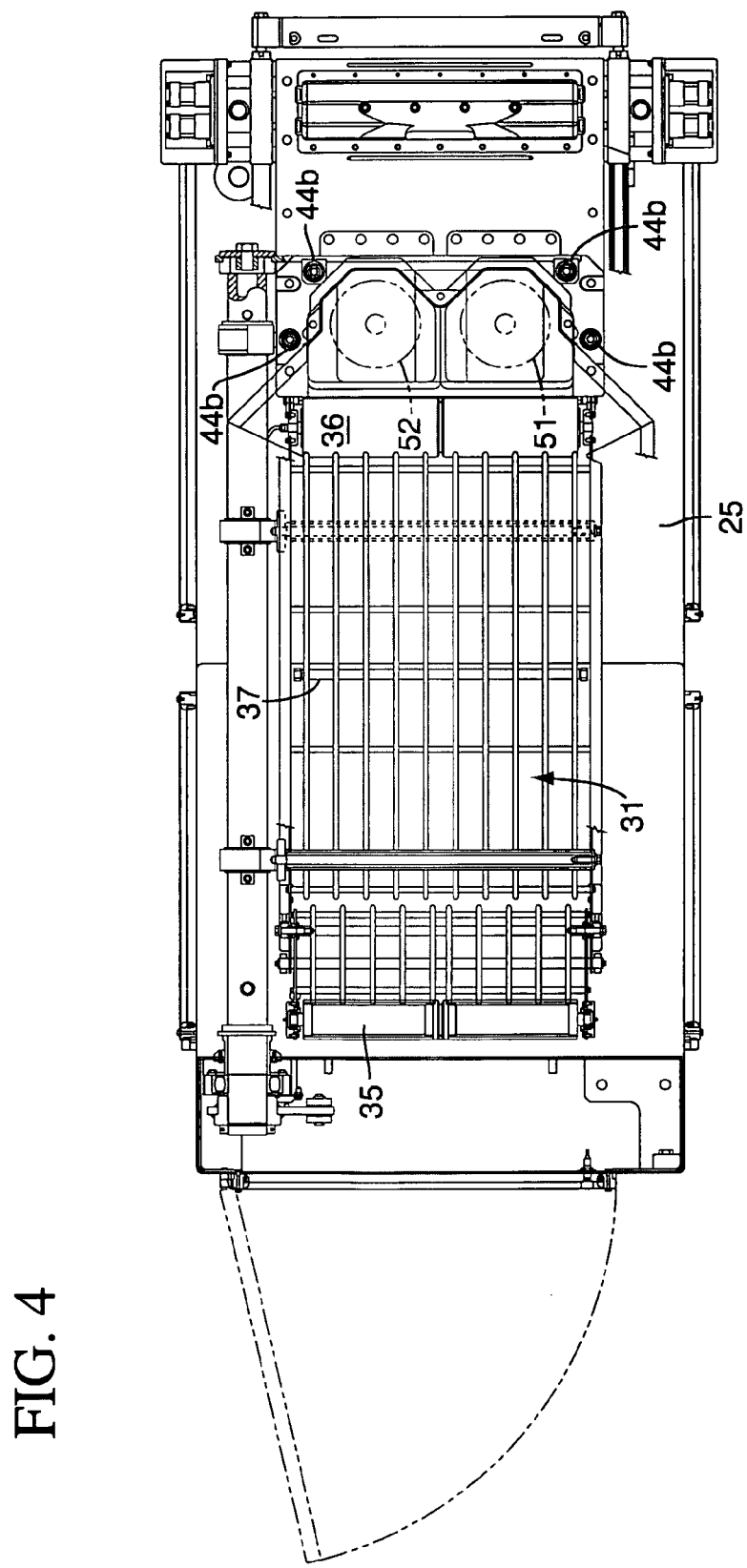
FIG. 4 is a sectional view taken generally along line 4-4 of FIG. 2, with some components and/or panels removed for clarity.

As best illustrated in FIGS. 3 and 6 mold plate 32 is connected to drive rods 128 that extend alongside housing 71 and are connected at one end to a transverse bar 129. The other end of each drive rod 128 is pivotally connected to a connecting link 131 via a coupling plate 131*a* and a pivot connection 131*c*, shown in FIG. 11. The pivot connection 131*c* can include a bearing (not visible in the figures) surrounding a pin 131*d* within an apertured end 131*e* of the connecting link 131. The pin 131*d* includes a cap, or carries a threaded nut, on each opposite end to secure the crank arm to the coupling plate 131*a*.

Each drive rod 128 is carried within a guide tube 132 that is fixed between a wall 134 and a front bearing housing 133. The connecting links 131 are each pivotally connected to a crank arm 142 via a pin 141 that is journaled by a bearing 141*a* that is fit within an end portion of the connecting link 131. The pin crank arm 142 is fixed to, and rotates with, a circular guard plate 135. The pin 141 has a cap, or carries a threaded nut, on each opposite end that axially fixes the connecting link 131 to the crank arm 142 and the circular guard plate 135. The connecting link 131 also includes a threaded portion 131*b* to finely adjust the connecting link length.

The crank arms 142 are each driven by a right angle gear box 136 via a "T" gear box 137 having one input that is driven by a precise position controlled motor 138 and two outputs to the gearboxes 136. The "T" gear box 137 and the right angle gear boxes 136 are configured such that the crank arms 142 rotate in opposite directions at the same rotary speed.

The precise position controlled motor can be a 6-7.5 HP totally enclosed fan cooled servo motor. The servo motor is provided with two modules: a power amplifier that drives the servo motor, and a servo controller that communicates precise position information to the machine controller.

The controller and the servo motor 138 are preferably configured such that the servo motor rotates in an opposite rotary direction every cycle, i.e., clockwise during one cycle, counterclockwise the next cycle, clockwise the next cycle, etc.

A bearing housing 143 is supported on each gearbox 136 and includes a rotary bearing 143*a* therein to journal an output shaft 136*a* of the gear box 136. The output shaft 136*a* is fixed to the crank arm 142 by a clamp arrangement formed by legs of the crank arm 142 that surround the output shaft and have fasteners that draw the legs together to clamp the output shaft between the legs (not shown), and a longitudinal key (not shown) fit into a keyway 136*b* on the output shaft and a corresponding keyway in the crank arm 142 (not shown).

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

During a molding operation, the molding mechanism 28 is assembled as shown in FIGS. 2 and 9A, with cover plate 122 tightly clamped onto spacers 124.

The knockout cups 33 are driven by a knockout drive mechanism as described in U.S. Ser. No. 10/943,809, filed on the same day as the present application, and herein incorporated by reference.

Figure 9B:
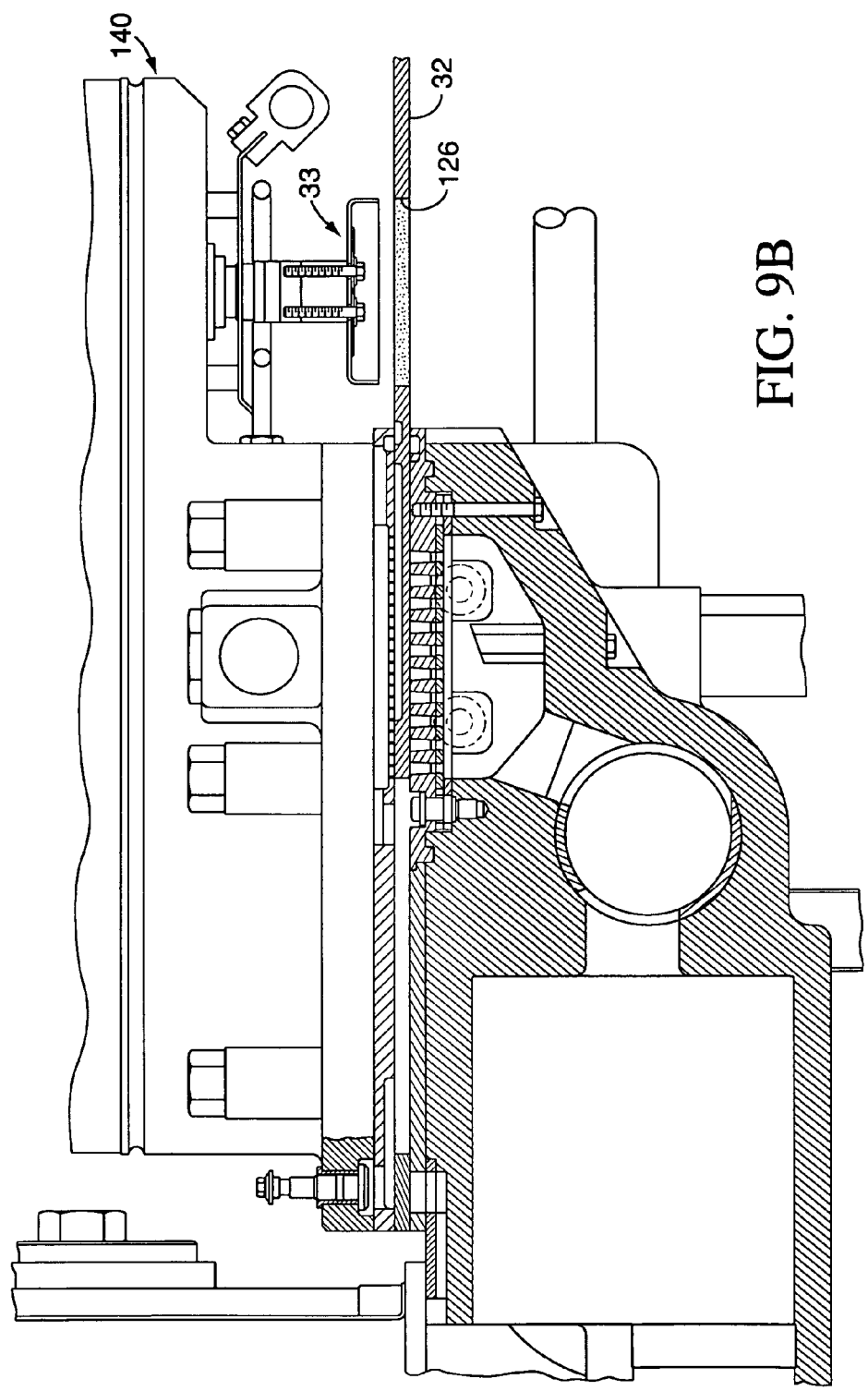
FIG. 9B is an enlarged fragmentary sectional view taken from FIG. 2, showing the machine configuration as the mold plate in a patty-discharge position.
Figure 10:
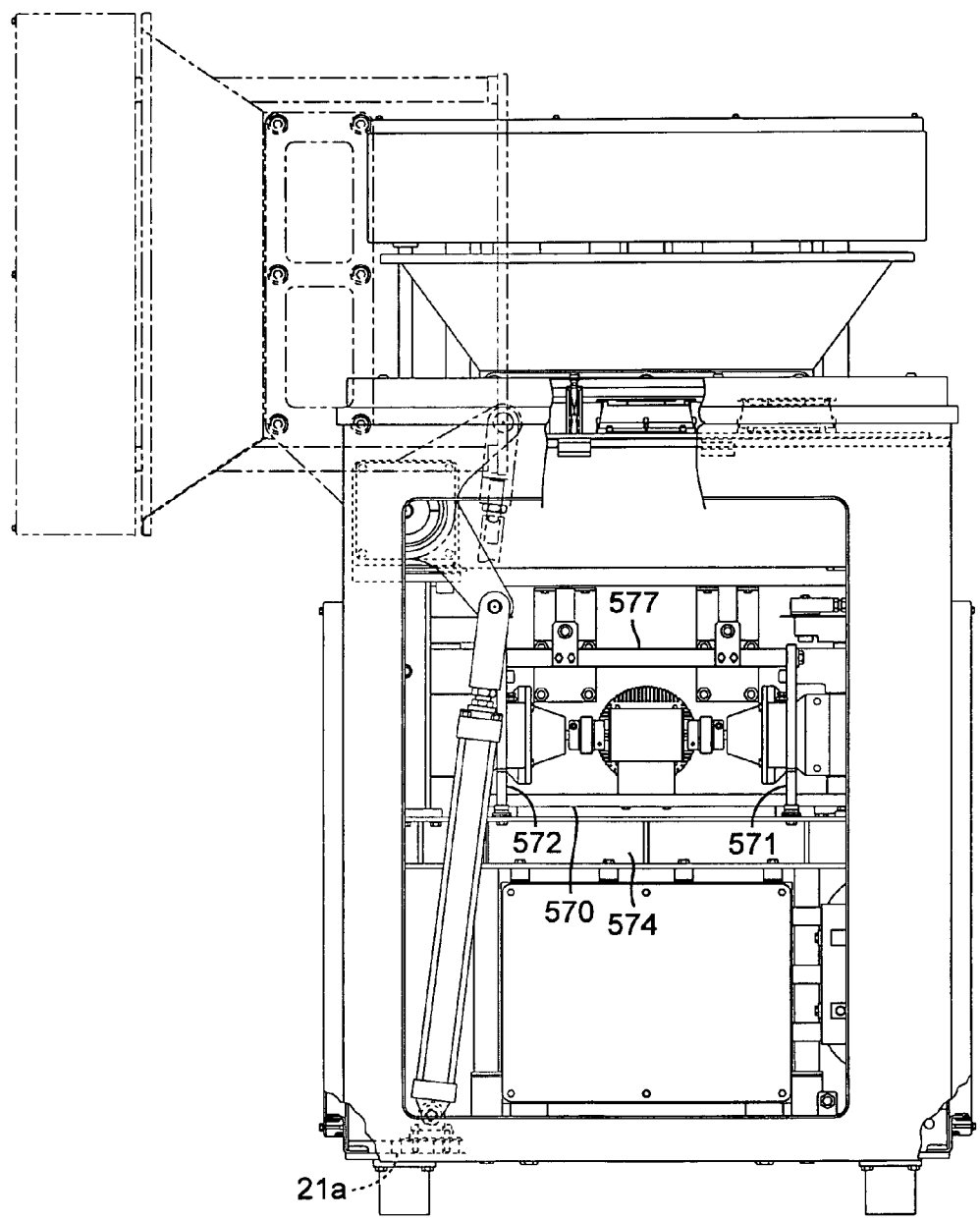
FIG. 10 is a sectional view taken generally along line 10-10 of FIG. 2, with some components and/or panels removed for clarity.

In each cycle of operation, knockout cups 33 are first withdrawn to the elevated position as shown in FIG. 9B. The drive for mold plate 32 then slides the mold plate from the full extended position to the mold filling position illustrated in FIGS. 2 and 9A, with the mold cavities 126 aligned with passageway 111.

During most of each cycle of operation of mold plate 32, the knockout mechanism remains in the elevated position, shown in FIG. 9B, with knockout cups 33 clear of mold plate 32. When mold plate 32 reaches its extended discharge position as shown in FIG. 9B the knockout cups 33 are driven downward to discharge the patties from the mold cavities.

The discharged patties may be picked up by the conveyor 29 or may be accumulated in a stacker. If desired, the discharged patties may be interleaved with paper, by an appropriate paper interleaving device. Such a device is disclosed in U.S. Pat. No. 3,952,478, or U.S. Ser. No. 60/540,022, filed on Jan. 27, 2004, both incorporated herein by reference. In fact, machine 20 may be used with a wide variety of secondary equipment, including steak folders, bird rollers, and other such equipment.

Machine Frame System

The preferred embodiment apparatus 20 of the present invention utilizes an exemplary frame 500 as illustrated in FIGS. 2, 3, 5-8 and 11-19. The frame 500 includes a thick base plate 21a. The base plate 21a comprises a stainless steel plate, ½ inch thick. Two rear anchors 506a, 506b and two forward anchors 508a, 508b are fastened to the base plate 21a with fasteners 507a and keys 507b, in a rectangular pattern. The base plate 21a and the anchors have recesses or keyways to receive the keys 507b.

Two rear struts 510a, 510b extend obliquely forward in parallel from the rear anchors 506a, 506b and are fastened thereto using fasteners and shims. Two forward struts 510a, 510b extend obliquely rearward in parallel from the front anchors 508a, 508b and are fastened thereto using fasteners and shims.

As illustrated in FIGS. 2, 11, 12, and 17 each rear strut 510a, 510b comprises a rectangular tube column 510c having a plate flange 510d, 510e welded to each end thereof. The tube columns preferably have 3 inch by 2 inch by ¼ inch thick cross sections. The bottom plate flange 510d is fastened to the respective anchor 506a, 506b using fasteners and shims. Each anchor includes a central stud threaded into the anchor and abutting the respective base plate and used for positioning and spacing the bottom flange 510d so that the shims may be installed before the strut is fastened to the anchor. The top plate flange 510e is fastened to a vertical backing plate 516 using fasteners 507a and a key 507b fit into keyways in the flange 510e and the backing plate 516.

Figure 17:
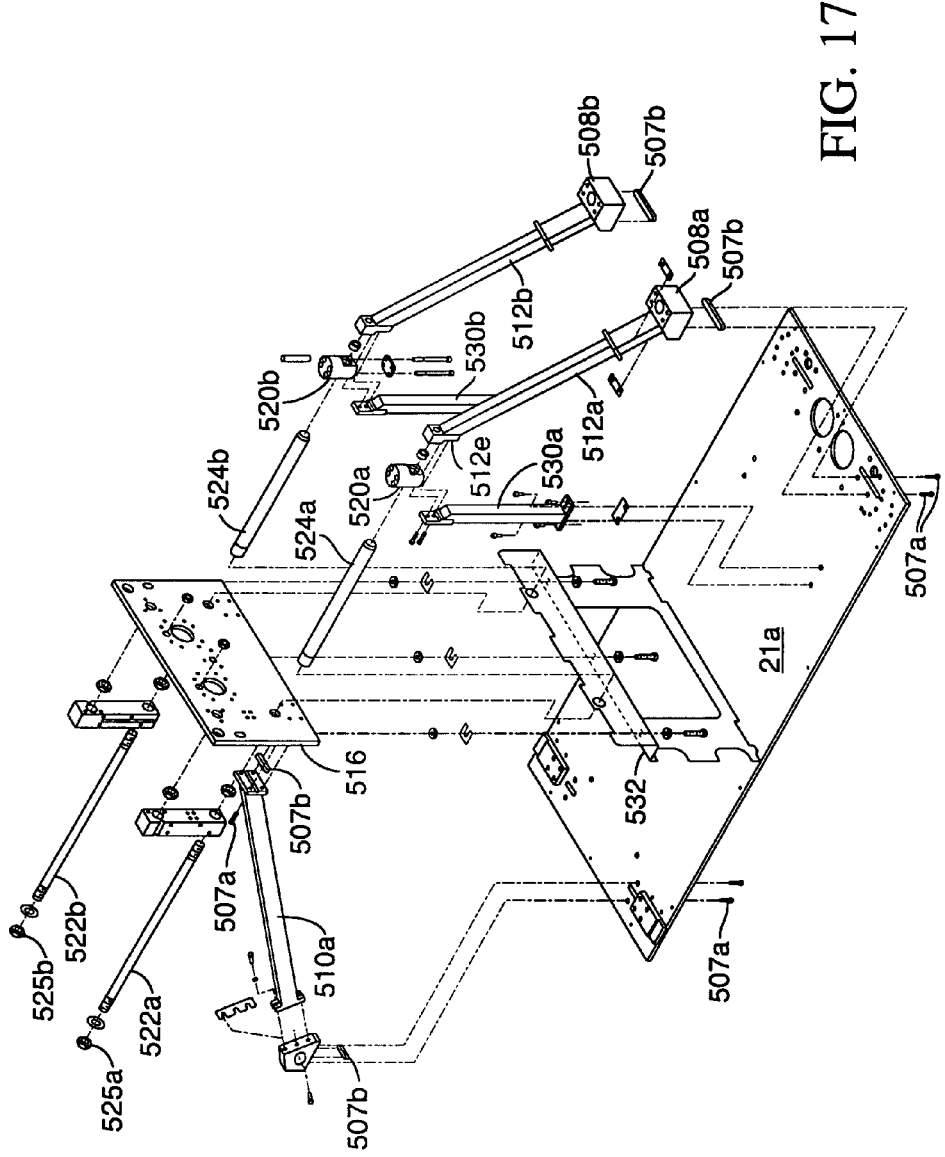
FIG. 17 is an exploded perspective view of a portion of the frame structure of the apparatus.

As illustrated in FIGS. 2, 5 and 17, each of forward struts 512a, 512b comprises a rectangular tube column 512c having a plate flange 512d welded to each bottom end thereof and a block flange 512e welded to each top end thereof. The tube columns preferably have 3 inch by 2 inch by ¼ inch thick cross sections. Each bottom plate flange 512d is fastened to a respective anchor 508a, 508b. The top block flanges 512e, 512e are fastened to a respective connection block 520a, 520b, by a tie rod 522a, 522b that is threaded into the respective block flange 512e. The connection blocks 520a, 520b are fastened to the manifold 27.

The tie rods 522a, 522b are surrounded by respective surrounding sleeves or spacers 524a, 524b located between respective connection block 520a, 520b and the vertical backing plate 516. The tie rod 522a, 522b are tensioned by nuts 525a, 525b via tie backing blocks 526a, 526b. The spacers 524a, 524b are compressed between the connection blocks 520a, 520b and the backing plate 516 when the nuts 525a, 525b are tightened.

The tie rods 522a, 522b are preferably 1¼ inch in diameter and the spacers are 2¾ inch in outside diameter.

The connection blocks 520a, 520b are supported by internal columns 530a, 530b that are fastened to the base plate 21a (FIGS. 2 and 13) and the block flanges 512e. The internal columns 530a, 530b are preferably square tubes having a 2 inch by 2 inch by ¼ inch thick cross section. The vertical backing plate 516 is supported by a wall 532 provided within the machine base 21. The plate 516 is fastened to the wall 532.

A pair of columns 531a, 531b supports the manifold 27 at a front of the machine (FIGS. 2, 8, 15 and 19). The columns are formed by tie rods 531c surrounded by tubular spacers 531d. The tie rods 531c are fastened to the anchors 508a, 508b using nuts 531e. The upper end of the tie rod can be threaded into the manifold 27. The tubular spacer is compressed between the manifold 27 and the respective anchor 508a, 508b when the nuts 531e are tightened.

As shown in FIGS. 3 and 6, three more tie rods, with associated spacers or sleeves are used. Two top level tie rods 532a, 532b, surrounded by spacers or sleeves 536a, 536b, and located laterally outside the pump cavities 69, 89 are threaded into threaded bores in the pump housing 71. The tie rods 532a, 532b are tensioned with nuts 537a, 537b on a rear side of backing plate 516, via the backing blocks 526a, 526b. A central tie rod 540 surrounded by a spacer or sleeve 542 and located laterally between the pump cavities 69, 89 is threaded into a threaded bore in the pump housing 71 and is tensioned by a nut 543 and washer pressed directly against the backing plate 516.

The tie rods, when tensioned, compress the spacers or sleeves 525a, 525b, 536a, 536b and 542 tightly between the backing plate 516 and the pump housing 71 and the connection blocks 520a, 520b which are fastened to, or formed as part of the manifold housing 71.

The tie rods 532a, 532b, 540 have a diameter of 1¼ inch and the spacers 536a, 536b and 542 have a 2¾ inch outside diameter.

The hydraulic cylinders 64, 84 have front flanges 64a, 84a bolted to the backing plate 516 via two reinforcing washer plates 548a, 548b. Thus, when one of the hydraulic cylinders 64, 84 drives the respective piston 66, 68 into the pump cavity 69, 89 to pressurize the food product therein, a reaction force is created that tends to separate the backing plate 516 from the pump housing 71. The five tie rods oppose this reaction force by tension in the tie rods. Because the tie rods take up this reaction force, instead of the machine frame, the associated stress within the machine frame is reduced, or eliminated.

Figure 11:
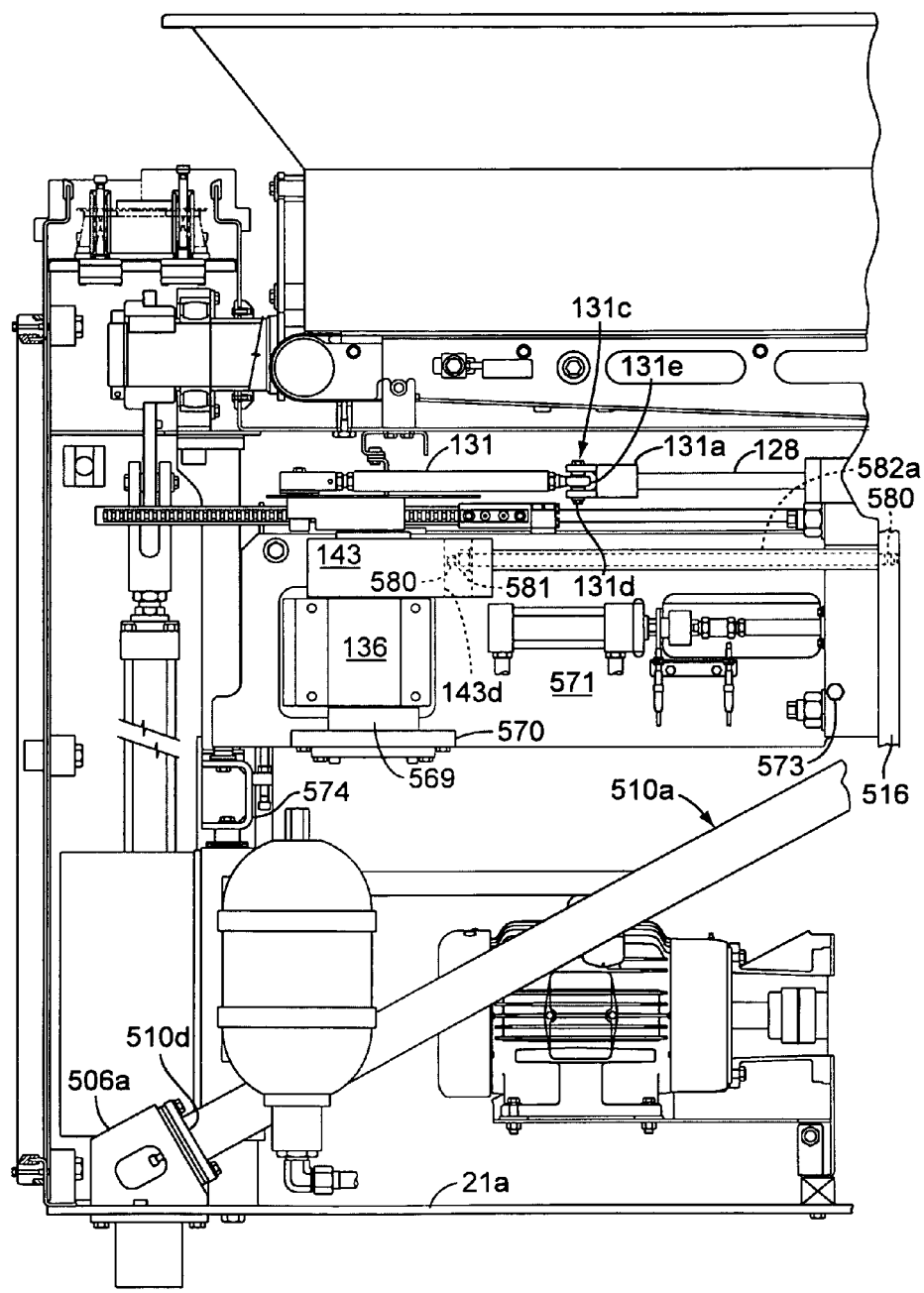
FIG. 11 is an enlarged, fragmentary view taken from the left side of FIG. 2.
Figure 12:
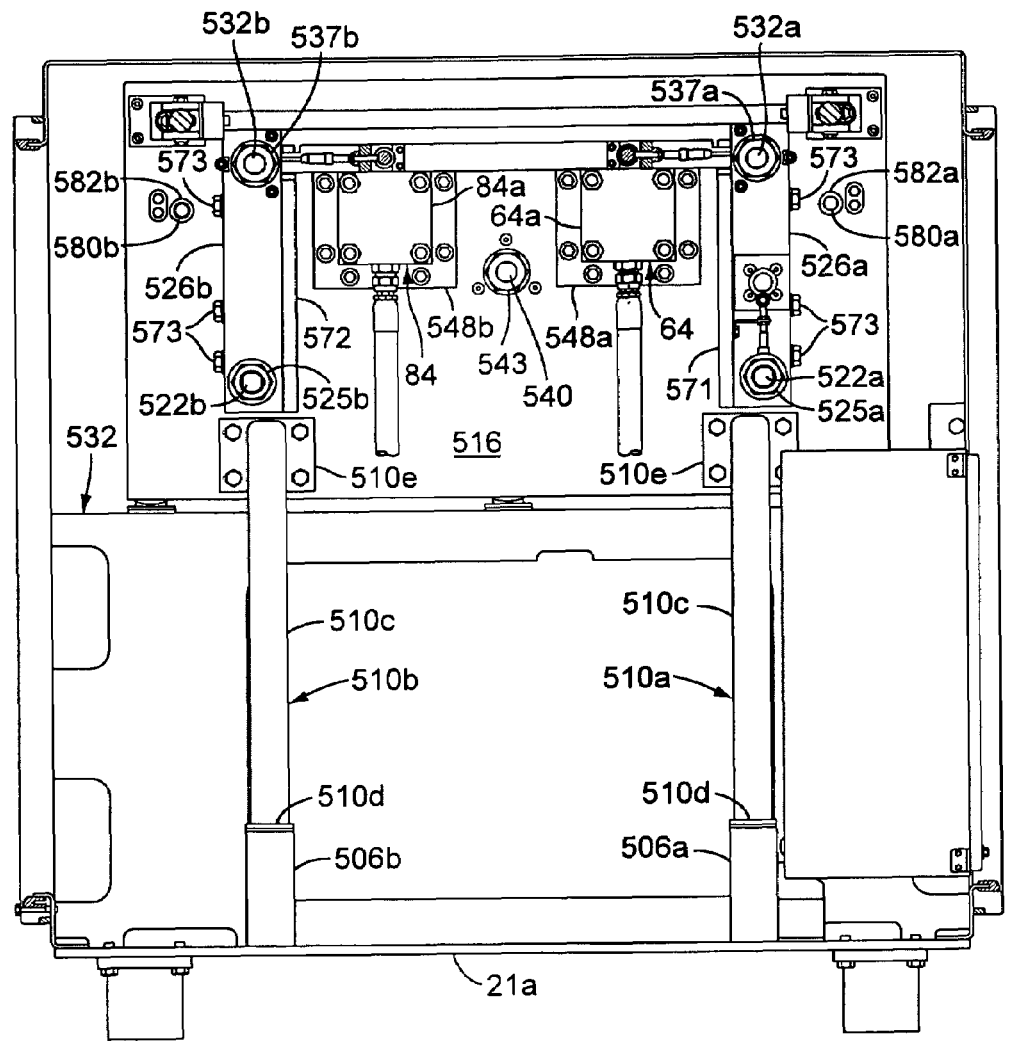
FIG. 12 is a fragmentary sectional view taken generally along line 12-12 of FIG. 2, with some components and/or panels removed for clarity.
Figure 13:
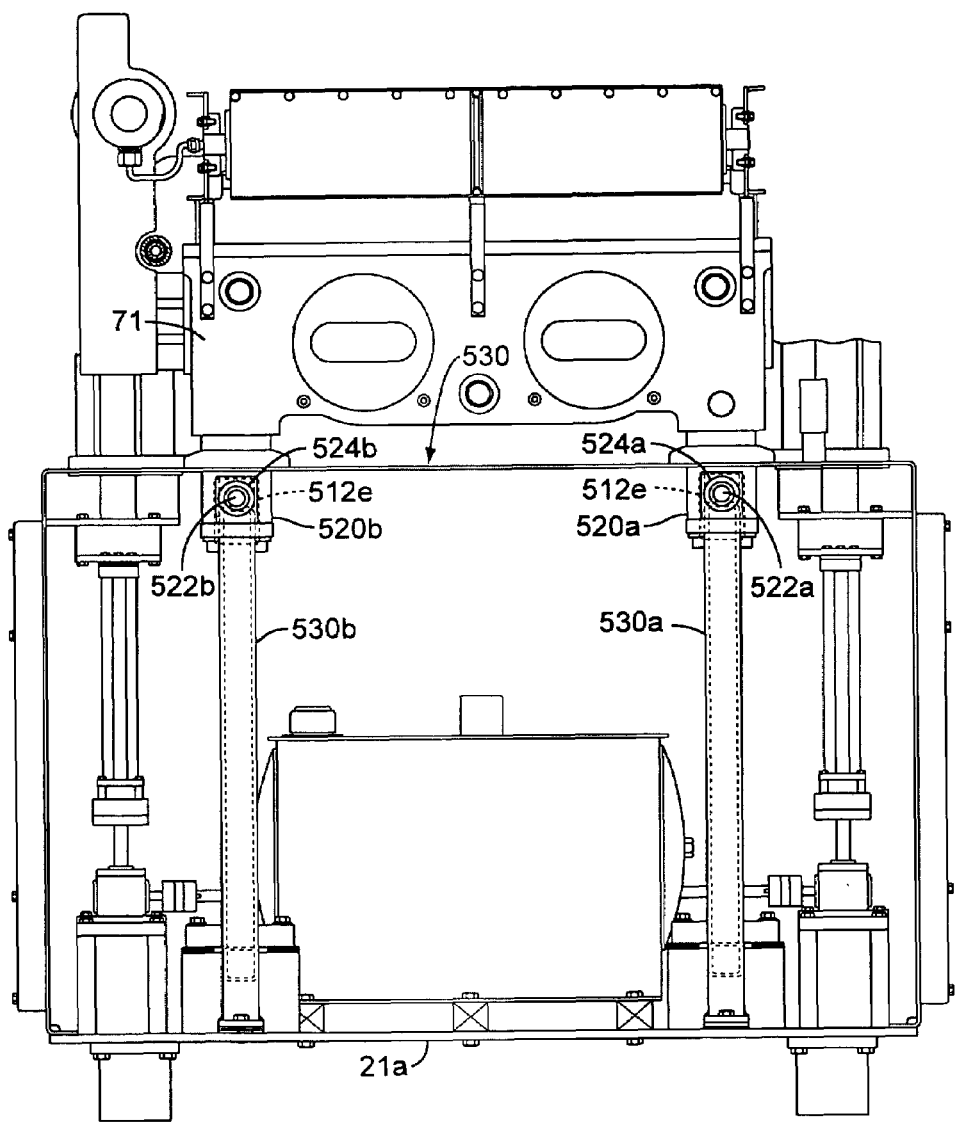
FIG. 13 is a fragmentary sectional view taken generally along line 13-13 of FIG. 2, with some components and/or panels removed for clarity.

As shown in FIGS. 3 and 6, the T gear box 137 is supported from a pedestal 568 on a support plate 570. The right angle gearboxes 136 are also supported from pedestals 569 fastened to the plate 570 (FIG. 11). The support plate 570 is fastened to a bottom of two vertically oriented, parallel, longitudinally arranged plates 571, 572. The plates 571, 572 are supported at a rear by being fastened to a crossbeam 574 that is supported by sidewalls of the machine base 21.

Figure 18:
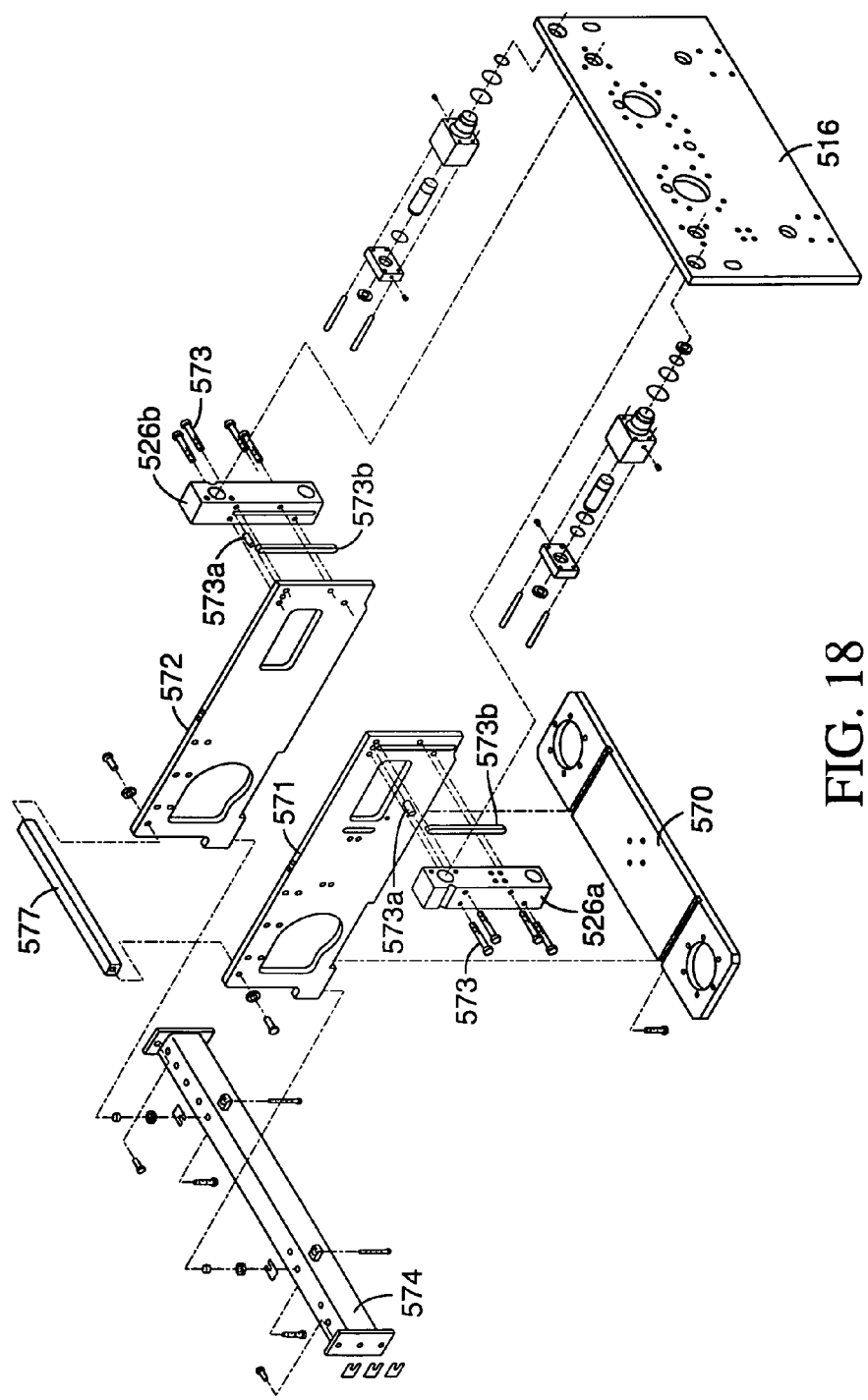
FIG. 18 is an exploded perspective view of a rear portion of the frame structure of the apparatus.

The longitudinally arranged plates 571, 572 are laterally braced by a cross brace 577. The plates 571, 572 extend to the backing plate 516 and are fastened thereto by being fastened to the backing blocks 526a, 526b respectively by fasteners 573, locating pins 573a, and keys 573b fit into corresponding keyways in the blocks 526a, 526b and the plates 571, 572 (FIG. 18).

According to the preferred embodiment, the backing plate 516 has a thickness of 1¼ inches. The plates 571, 572 can have thicknesses of ¾ inches and heights of 13¼ inches. The support plate 570 can have a thickness of 1¼ inches.

For additional rigidity, the bearing housings 143 that are located above each right angle gear box 136, are connected by pre-stressed tie rods 580a, 580b to the backing plate 516. The tie rods 580a, 580b are threaded into tapped holes in the backing plate 516 and secured to each respective housing 143 by a nut 581. A vertical, rectangular opening 143d is provided through each bearing housing 143 to access the nuts 581 (FIG. 11). Each nut 581 is threaded onto an end of one rod 580a, 580b and tightened against the respective bearing housing 143. The tie rods 580a, 580b are surrounded by respective tubes 582a, 582b. The tubes 582a, 582b are compressed between a respective housing 143 and the backing plate 516 when the nuts 581 are tightened onto the tie rods 580*a*, 580*b*. The tie rods 580*a*, 580*b*, and the tubes 582*a*, 582*b* fix the bearing housings 143 with respect to the backing plate 516. The tie rod 580*b* and tube 582*b* are not shown in FIG. 11 but are identically configured and attached in parallel fashion as the tie rod 580*a*, 582*a*. The tie rods have a diameter of ⅝ inches.

Figure 14:
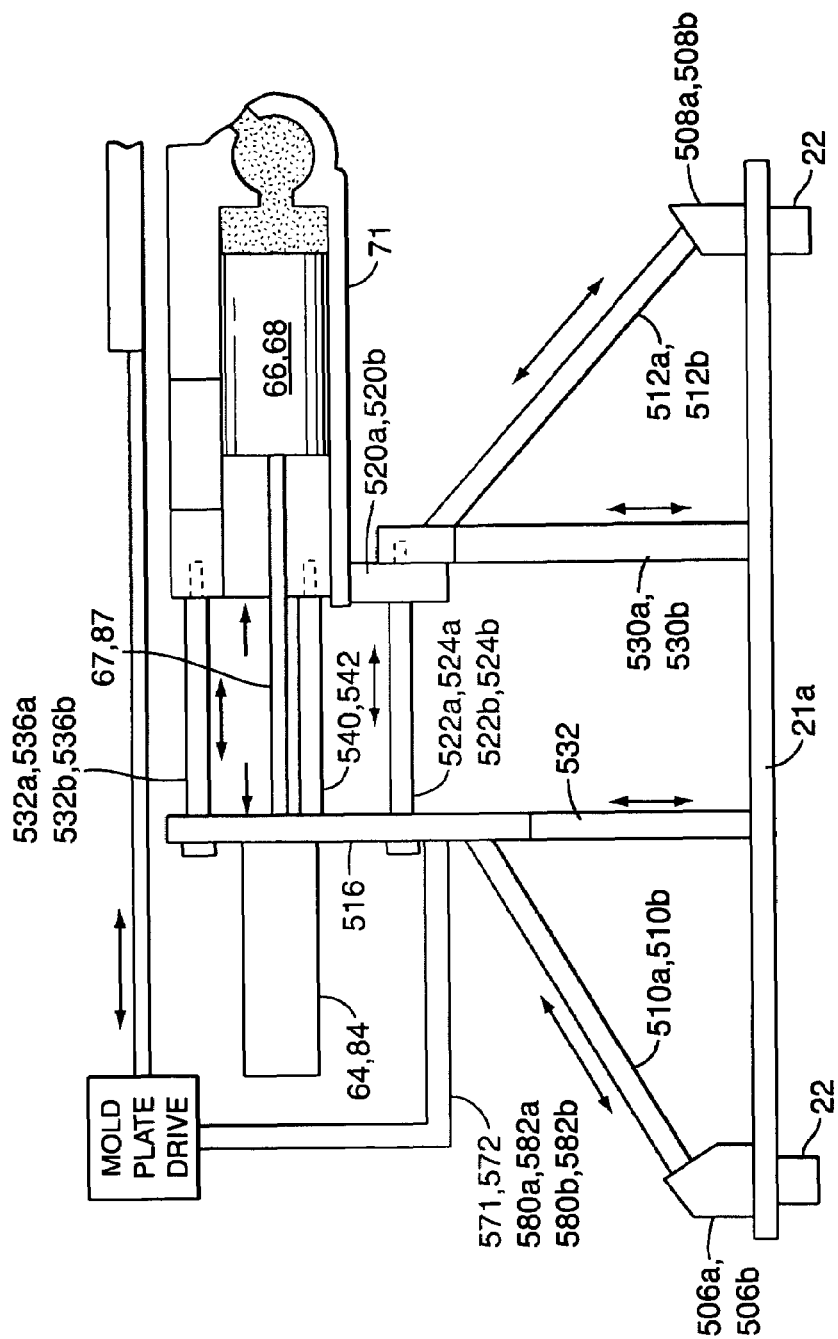
FIG. 14 is a diagrammatic view of the frame structure of the preferred embodiment of the invention.

As shown in FIG. 14, reciprocating forces from the mold plate and drive system originate substantially in the horizontal plane of movement of the mold plate. These reciprocating forces are resisted by forces transmitted through the plates 570, 571, 572 and the tie rod/tube combinations 580*a*, 582*a* and 580*b*, 582*b* to the vertical backing plate 516. The horizontal component of some of the reciprocation forces is transferred through the vertical backing plate through the rear struts 510*a*, 510*b* and into the base plate 21*a*.

The horizontal component of some of the reciprocation forces is transferred through the tie rod/tube combinations 532*a*, 536*a*; 532*b*, 536*b*; 540,542; 522*a*, 524*a*; and 522*b*, 524*b* to the pump housing 71 and the blocks 520*a*, 520*b*. These forces are transferred through the blocks 520*a*, 520*b* through the forward struts 512*a*, 512*b* and into the base plate 21*a*.

According to one aspect of the invention, the individual struts 510*a*, 510*b*, 512*a*, 512*b* are removable given the fact that they are fastened in place using fasteners and can be removed from the machine base 21 and replaced. This is particularly advantageous during assembly and replacement of other components, wherein the struts can be removed for access to other components within the machine base 21.

Figure 19:
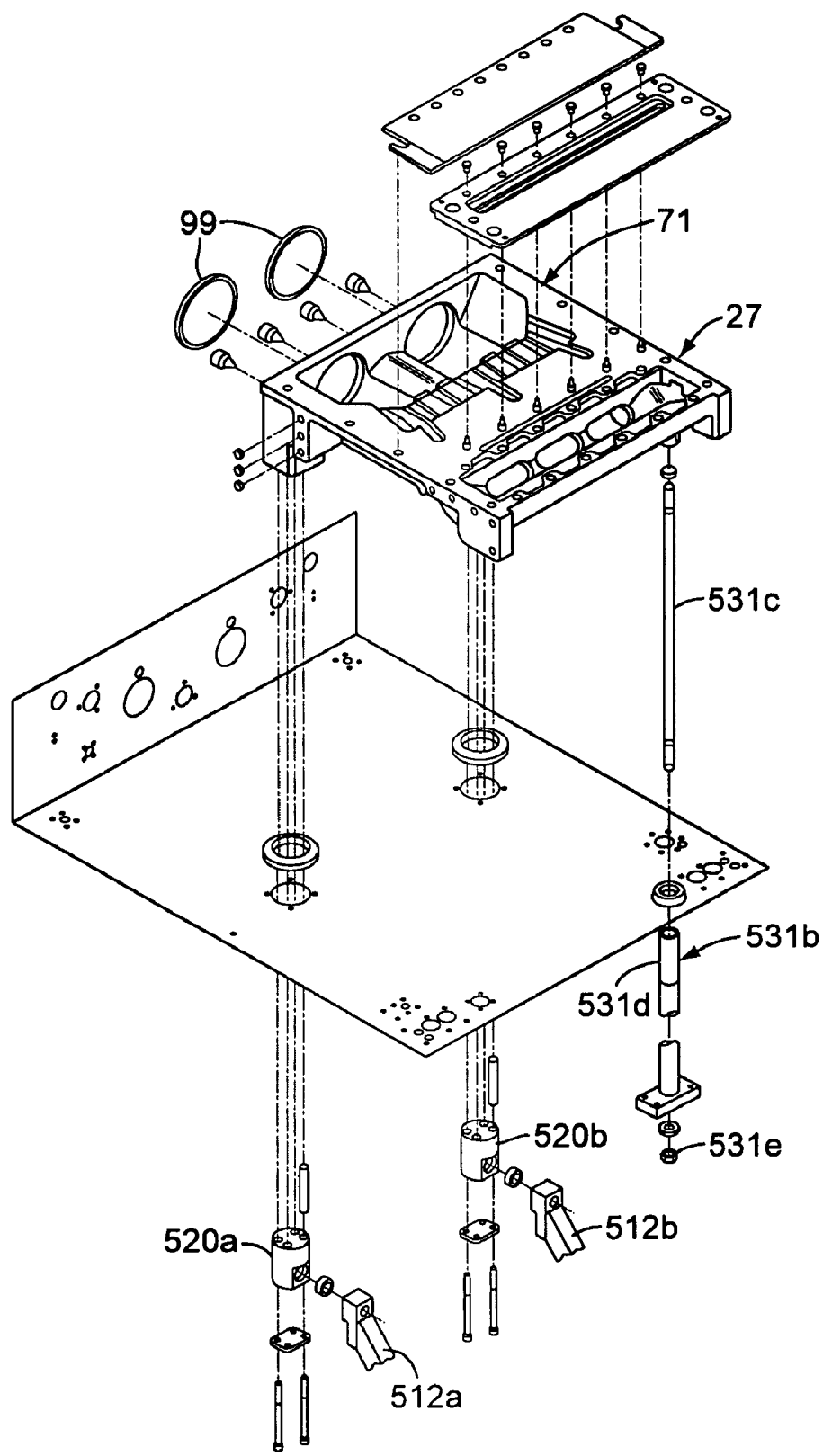
FIG. 19 is an exploded perspective view of a front portion of the frame structure of the apparatus.

All of the internal structural members can be composed of structural steel, except the base plate 21*a* is preferably composed of stainless steel and the pump housing 71 and manifold 27 are preferably composed of stainless steel. FIG. 19 illustrates the pump housing 71 and the valve manifold 27 as a single cast stainless steel part. By forming these parts as a unitary part, significant assembly time is reduced, and the machine part count is reduced.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A frame structure for a reciprocating mold plate type food product forming apparatus, wherein the forming apparatus comprises at least one hydraulically driven pump that includes a pump piston driven into a pump cylinder by a driving mechanism, and a reciprocating drive and connected to a mold plate, comprising
   a frame portion supporting the reciprocating mold plate;
   a base structure;
   a first angular strut extending obliquely from a rear location on said base structure forward and upwardly to an elevated central location and fixed to said frame portion;
   a second angular strut extending obliquely from a forward location on said base structure rearward and upwardly to said elevated central location and fixed to said frame portion, and
   said first and second struts being sufficiently rigid to withstand reciprocal forces caused by said reciprocating mold plate.

2. The frame structure according to claim 1, wherein said frame portion supports said hydraulic cylinder and said pump cylinder, and comprises rods operatively connected between said driving mechanism and said pump cylinder, said rods having a thickness to resist a reaction force caused by said pump piston compressing food product within said pump cylinder.

3. The frame structure according to claim 1, wherein at least one of said angular struts is fastened to said central location and to said base structure to be removable.

4. The frame structure according to claim 1, wherein said base structure comprises a steel plate substantially coextensive in plan with said frame structure.

5. The frame structure according to claim 1, comprising a third angular strut laterally spaced from and substantially parallel to said first angular strut, and a fourth angular strut laterally spaced from and substantially parallel to said second angular strut, said third and fourth angular struts fixed between said base structure and said central location.

6. The frame structure according to claim 1, comprising at least one tie rod fixed between a stationary portion of said reciprocating drive and said elevated central location.

7. The frame structure according to claim 1, comprising at least one vertical, horizontally extending plate connected between a stationary portion of said reciprocating drive and said elevated central location.

8. A frame structure for a food product forming apparatus that comprises a pump cylinder that receives food product to be pressurized by a pump plunger that is driven into the cylinder by a driving mechanism, comprising:
   a plurality of tie rods extending between said pump cylinder and said driving mechanism, said tie rods resisting a separation reaction force between said pump cylinder and said driving mechanism.

9. The frame structure according to claim 8, wherein said driving mechanism comprises a hydraulic cylinder having an extendable rod connected to the pump plunger, and said hydraulic cylinder is mounted to a backing plate, said tie rods extending between said backing plate and said pump cylinder to prevent separation of said backing plate and said pump cylinder during compressions of food product therein.

10. The frame structure according to claim 8, wherein said pump cylinder is one of two pump cylinders arranged side-by-side within a manifold housing, and said tie rods are arranged to be fixed to said manifold housing and arranged both outside of and between said pump cylinders.

11. The frame structure according to claim 10, wherein said driving mechanism is mounted to a backing plate, and comprising a plurality of tube spacers, wherein each tie rod is surrounded by a spacer having opposite ends abutting said backing plate and said manifold housing.

12. The frame structure according to claim 10, wherein said apparatus comprises a reciprocating mold plate, and comprising a base structure and a backing plate, said driving mechanism being mounted to said backing plate, and at least one support frame member vertically supporting said backing plate, and at least one angular strut connected to said backing plate and connected to said base structure, said angular strut configured to resist a horizontal component of a reciprocating force of said mold plate.

13. A frame structure for a reciprocating mold plate type food product forming apparatus, wherein said forming apparatus comprises a reciprocating drive and connected to a mold plate, comprising
   a frame portion supporting said reciprocating mold plate;
   a base structure;
   a first angular strut extending obliquely from a rear location on said base structure forward and upwardly to an elevated central location and fixed to said frame portion;

a second angular strut extending obliquely from a forward location on said base structure rearward and upwardly to said elevated central location and fixed to said frame portion, and said first and second struts being sufficiently rigid to withstand reciprocal forces caused by said reciprocating mold plate.

14. The frame structure according to claim 13, wherein at least one of said angular struts is fastened to said central location and to said base structure to be removable.

15. The frame structure according to claim 13, wherein said base structure comprises a steel plate substantially coextensive in plan with said frame structure.

16. The frame structure according to claim 13, comprising a third angular strut laterally spaced from and substantially parallel to said first angular strut, and a fourth angular strut laterally spaced from and substantially parallel to said second angular strut, said third and fourth angular struts fixed between said base structure and said central location.

17. The frame structure according to claim 13, comprising at least one tie rod fixed between a stationary portion of said reciprocating drive and said elevated central location.

18. The frame structure according to claim 13, comprising at least one vertical, horizontally extending plate connected between a stationary portion of said reciprocating drive and said elevated central location.

19. In a reciprocating mold plate food product forming apparatus, wherein the forming apparatus comprises at least one hydraulically driven pump that includes a pump piston driven into a pump cylinder by a hydraulic cylinder, the improvement comprising:

a one piece pump housing comprising a pump cylinder having an open end for receiving a pump piston and a substantially closed end with an outlet opening for the passing of pressurized food product.

20. The improvement according to claim 19, wherein said one piece pump housing comprises a further pump cylinder having an open end for receiving a further pump piston and a substantially closed end with a further outlet opening for the passing of pressurized food product, and said valve manifold comprises a cylindrical cavity having inlet and outlet ports, said inlet ports open to said outlet opening and said further outlet opening, wherein said valve manifold is configured to accept a valve element therein.

21. The improvement according to claim 20, further comprising a valve manifold in flow communication with said pump housing, said valve manifold formed as a unitary piece with said pump housing.

* * * * *

UNITED STATES PATENT AND TRADEMARK OFFICE
CERTIFICATE OF CORRECTION

| | |
|---|---|
| PATENT NO. | : 7,318,723 B2 |
| APPLICATION NO. | : 10/942726 |
| DATED | : January 15, 2008 |
| INVENTOR(S) | : Glenn Sandberg et al. |

It is certified that error appears in the above-identified patent and that said Letters Patent is hereby corrected as shown below:

At column 11, line 8, change "%" to --3/4--.

Signed and Sealed this
Ninth Day of August, 2011

David J. Kappos
*Director of the United States Patent and Trademark Office*